ELECTRONIC RECEIVER-CONTROLLER WITH STORAGE UNIT

Original Filed July 24, 1959 19 Sheets-Sheet 1

INVENTORS
EDWARD F. KLEINSCHMIDT
DAVID F. FRICK
BY Strauch, Nolan & Neale
ATTORNEYS

INVENTORS
EDWARD F. KLEINSCHMIDT
DAVID F. FRICK

BY Strauch, Nolan & Neale
ATTORNEYS

Dec. 19, 1967 E. F. KLEINSCHMIDT ET AL 3,359,368

ELECTRONIC RECEIVER-CONTROLLER WITH STORAGE UNIT

Original Filed July 24, 1959 19 Sheets-Sheet 3

INVENTORS
EDWARD F. KLEINSCHMIDT
DAVID F. FEICK

BY Strauch, Nolan & Neale

ATTORNEYS

Dec. 19, 1967 E. F. KLEINSCHMIDT ET AL 3,359,368

ELECTRONIC RECEIVER-CONTROLLER WITH STORAGE UNIT

Original Filed July 24, 1959 19 Sheets-Sheet 4

INVENTORS
EDWARD F. KLEINSCHMIDT
DAVID F. FRICK

BY Strauch, Nolan & Neale

ATTORNEYS

INVENTORS
EDWARD F. KLINSCHMIDT.
BY DAVID F. FRICK
Strauch Nolan & Neale
ATTORNEYS

INVENTORS
EDWARD F. KLEINSCHMIDT
DAVID F. FRICK

BY Strauch Nolan & Neale
ATTORNEYS

INVENTORS
EDWARD F. KLEINSCHMIDT
DAVID F. FRICK
BY Strauch, Nolan & Neale
ATTORNEYS INVENTORS
EDWARD F. KLEINSCHMIDT
DAVID F. FRICK
BY Strauch, Nolan & Neale
ATTORNEYS INVENTORS
EDWARD F. KLEINSCHMIDT
DAVID F. FRICK
BY
Strauch, Nolan & Neale
ATTORNEYS

INVENTORS
EDWARD F. KLEINSCHMIDT
DAVID F. FRICK

BY Strauch, Nolan & Neale

ATTORNEYS

INVENTORS
EDWARD F. KLEINSCHMIDT
DAVID F. FRICK

BY Strauch, Nolan & Neale

ATTORNEYS

INVENTORS
EDWARD F. KLEINSCHMIDT
DAVID F. FRICK

BY Strauch, Nolan & Neale

ATTORNEYS

INVENTORS
EDWARD F. KLEINSCHMIDT
DAVID F. FRICK

BY Strauch, Nolan & Neale

ATTORNEYS

INVENTORS
EDWARD F. KLEINSCHMIDT
DAVID F. FRICK

BY Strauch, Nolan & Neale
ATTORNEYS

ELECTRONIC RECEIVER-CONTROLLER WITH STORAGE UNIT

Original Filed July 24, 1959 19 Sheets-Sheet 15

INVENTORS
EDWARD F. KLEINSCHMIDT
DAVID F. FEICK

Strauch, Nolan & Neale
ATTORNEYS

ELECTRONIC RECEIVER-CONTROLLER WITH STORAGE UNIT

INVENTORS
EDWARD F. KLEINSCHMIDT
DAVID F. FRICK

BY Strauch, Nolan & Neale
ATTORNEYS

INVENTORS
EDWARD F. KLEINSCHMIDT
DAVID F. FRICK

Strauch, Nolan & Neale
ATTORNEYS

INVENTORS
EDWARD F. KLEINSCHMIDT
DAVID F. FRICK
BY
Strauch, Nolan & Neale
ATTORNEYS

ELECTRONIC RECEIVER-CONTROLLER WITH STORAGE UNIT

Original Filed July 24, 1959

INVENTORS
EDWARD F. KLEINSCHMIDT
DAVID F. FRICK
BY Strauch, Nolan & Neale
ATTORNEYS

United States Patent Office 3,359,368

Patented Dec. 19, 1967

3,359,368

ELECTRONIC RECEIVER-CONTROLLER WITH STORAGE UNIT

Edward F. Kleinschmidt, Fort Lauderdale, Fla., and David F. Frick, Palatine, Ill., assignors to SCM Corporation, New York, N.Y., a corporation of New York Original application July 24, 1959, Ser. No. 829,446, now Patent No. 3,150,235, dated Sept. 22, 1964. Divided and this application Nov. 22, 1963, Ser. No. 325,718

19 Claims. (Cl. 178—89)

ABSTRACT OF THE DISCLOSURE

An electronic coded signal receiving system with a receiving portion which receives coded element signals, whether in sequential or simultaneous element form, a storage portion which can store received coded signals and a controller portion enabling system operation including processing and utilization of the stored coded signals. The receiving portion includes a line current operated input signal multivibrator circuit with an associated signal transformer and full wave rectifier isolating the line D.C. from the receiving system components as well as a sequential to simultaneous coded signal convertor. The receiving portion connects through the storage portion to the controller portion which has demand read-out control over the storage portion responsive to further processing of the coded signals. The storage package has plural storage registers to provide a normal storage lag between receipt of signals and further processing and can include an auxiliary multiple channel storage unit connected between normal storage registers enabling storage, of, e.g., up to twenty additional coded signals, between receipt and further processing of the coded signals. The auxiliary storage unit has input and output controllers which direct storage and retrieval of excess code signals in identical sequence, i.e., it is a first-in, first-out storage unit.

This is a division of copending United States application Ser. No. 829,446, filed July 24, 1959, now Patent No. 3,150,235.

This invention pertains to telegraph receiving apparatus and more particularly to the receiving, controlling and storage units of a tape type receiving printer-reperforator combination capable of receiving code impulse combinations and recording visual representations of corresponding characters at any speeds up to at least 4500 operations per minute.

Although there are presently known many high speed printers as well as high speed reperforators, there are no printer-reperforators performing both functions at speeds higher than 600 operations per minute (368.1 operations per minute being the normal speed for telegraph apparatus). The primary purpose behind the development of the present invention and one which has been successfully accomplished by the invention was to provide a printer-reperforator apparatus that would punch a coded message on a tape, print this same identical message on one edge of the tape, and to accomplish both of these functions at the exceptionally high speed of 4500 operations per minute (this is 75 operations per second) and still retain reliability of operation over extended periods of time. It was desired to develop and construct such a high speed typing reperforator as a production model for use in fixed plant and military installations. In accomplishing this development, it was determined that selection and operation of the printing and perforating functions would be mechanical under the control of an electronic signal receiver and controller. The electronic receiver selector, storage unit and controller combination is unique, particularly in connection with its functioning and operation in control relationship with the mechanical perforating and printing mechanisms employed.

The electronic receiver selector storage and controller unit is capable of operational speeds many times higher than that of the mechanical printer and therefore must have some form of built-in delay control. Means are provided for storing backed-up signals which, at times, the printer will not be able to process because of an inherent range of operational function time between various ones of incoming signals to give a higher average number of operations per minute.

As has been described in the detailed description of the aforenoted parent application, the mechanical operational time depends upon the sequence in which the characters corresponding to the Baudot Code combination signals are being received. Some sequences of characters can be printed at maximum operational rates of 40 operations per second whereas others can be received and processed by the mechanical mechanism at operational speeds of up to 160 operations per second. Accordingly, the electronic receiver selector and controller is arranged to receive at 75 operations per second, an average speed which the mechanical printer-reperforator will normally be able to handle with a calculated back-up in the storage unit of no more than 20 characters. It is for this reason that a storage unit has been incorporated in the electronic mechanism. There are also means to bypass the storage unit if the incoming signals are being received at a rate no greater than 40 operations per second which the mechanical unit can take under the most adverse conditions with no back-up of signals.

Accordingly, the principal object of the present invention resides in the provision of a coded signal message receiving system having novel electronic receiving and control apparatus.

A further object, in conjunction with the preceding object, resides in the combination of the receiving and control apparatus for use with a mechanical recorder which has a range of maximum recording time depending upon a best and a worst reception sequence of characters and an optionally connected electronic storage device within the electronic controller section of the receiver apparatus adapting the controller to receive at a higher speed than the worst maximum recorder speed for the mechanical recorder, any back-up of signals between the recorder and controller being stored at random intervals in the electronic storage device.

A further object resides in providing a novel high speed code signal receiving apparatus including an electronic unit capable of receiving groups of incoming electrical code signals in either sequential or simultaneous form and converting such signals to simultaneous output channels, and an electronic controller unit including a search register enabling control of the electronic unit responsive to coded signal processing rate.

Another object resides in the provision of a novel line oscillator which completely isolates the receiver in the reperforator and printer apparatus from the incoming transmission line.

A still further object resides in the provision of a novel time base generator control circuit having a variable range control and optional RC circuits to operate the present invention on existing lines having different signal transmission rates.

Still another object resides in the provision of novel first and second register storage units in a telegraph receiver controller adapted for optional use of an auxiliary storage unit therebetween to momentarily store code signal impulses when they occur at a rate faster than they can be processed.

In conjunction with the preceding object, a further object resides in a novel input control circuit for the first register storage circuit for converting sequential signals to be simultaneously available for further processing in the apparatus.

Still another object resides in the provision, for use in combination with a coded signal receiving system, of a novel storage unit of the first-in, first-out type wherein signals are received at a random rate and retrieved at an independent random rate.

Further novel features and other objects of this invention will become apparent from the following detailed description, discussion and the appended claims taken in conjunction with the accompanying drawings showing a preferred structure and embodiment, in which:

Figure 7:
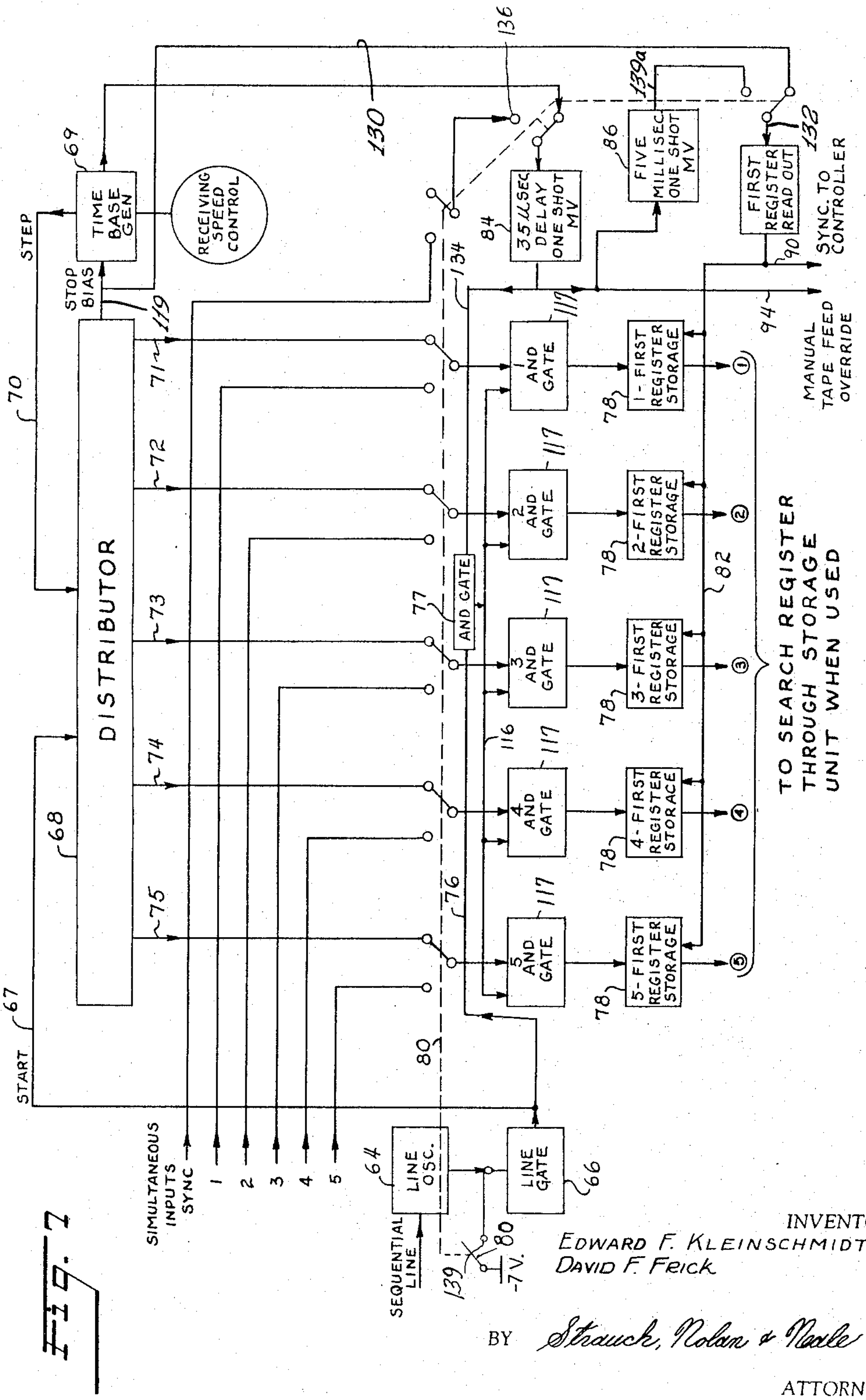
FIGURE 7 is a block diagram of the selector or sequential to parallel converter circuit which makes available, as an output signal, each of the five signal elements of the Baudot Code for simultaneous processing throughout the remainder of the electronic circuitry.
Figure 8:
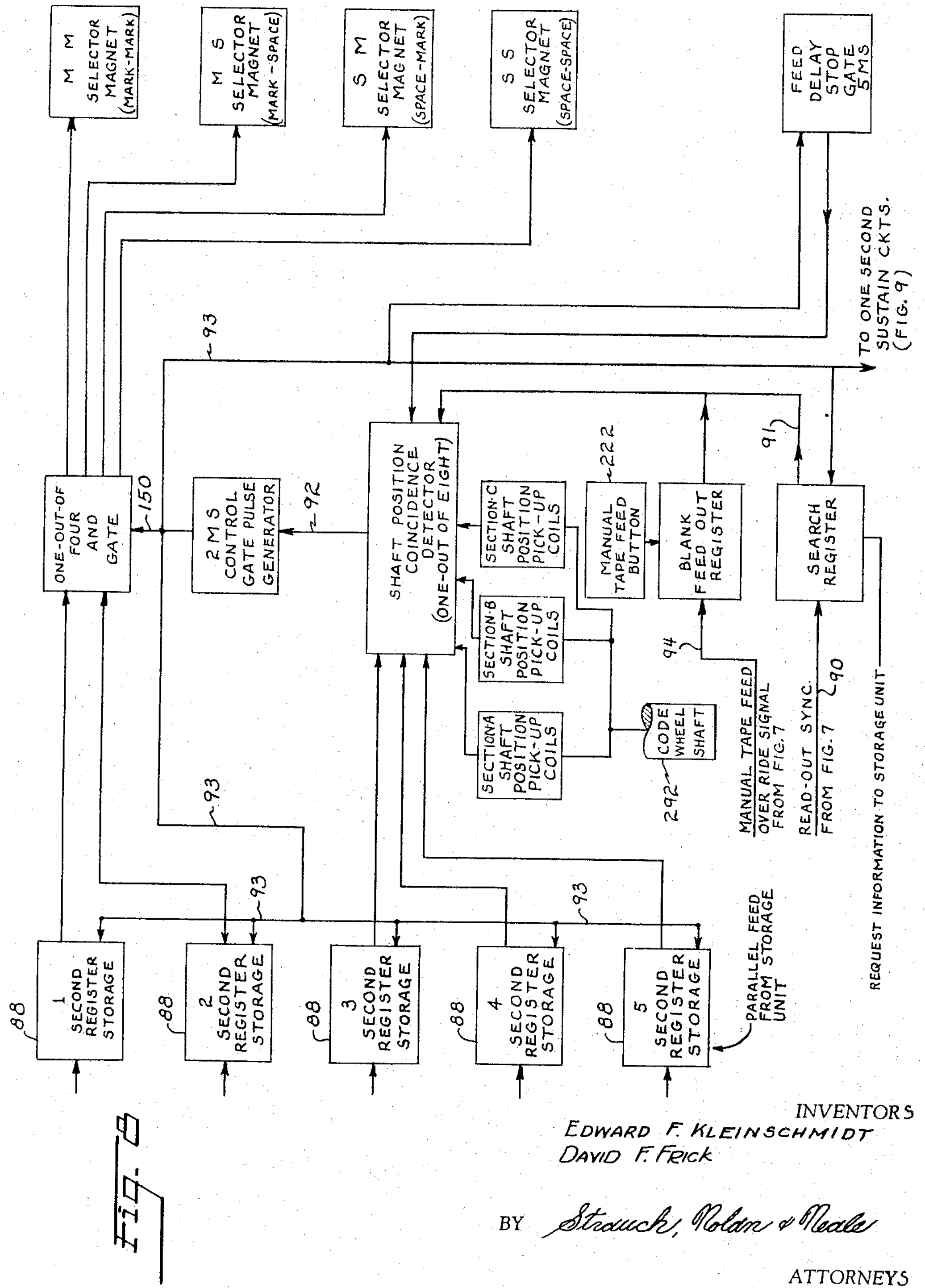
FIGURE 8 is a block diagram of the controller unit for selectively energizing one of four code rods at a time interval which is synchronized with the rotation of the code rod wheel shaft.
Figure 9:
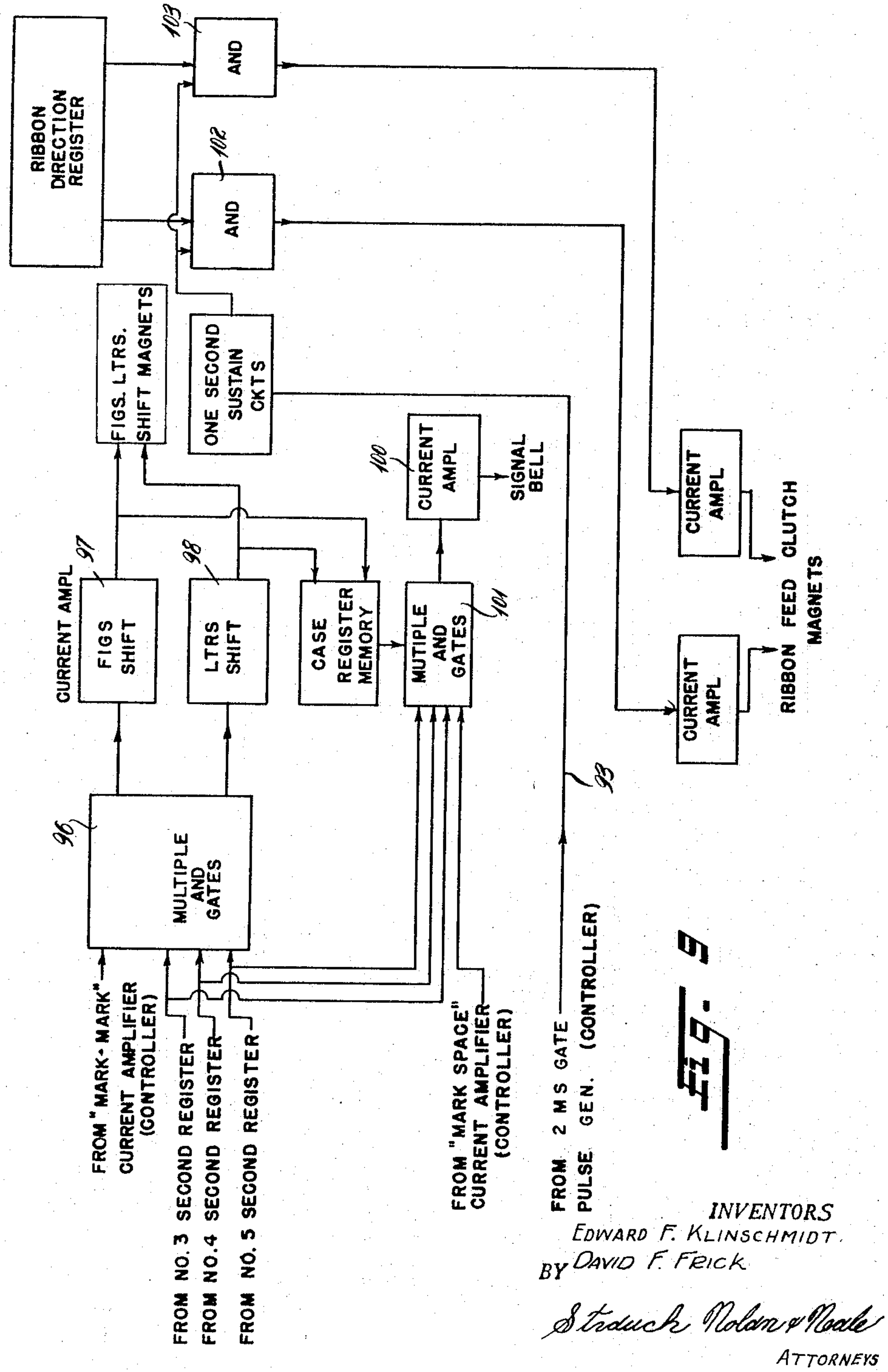
FIGURE 9 is a block diagram of certain of the auxiliary equipment included in the controller unit for controlling the operation of the perforator and printer equipment.
Figure 10A:
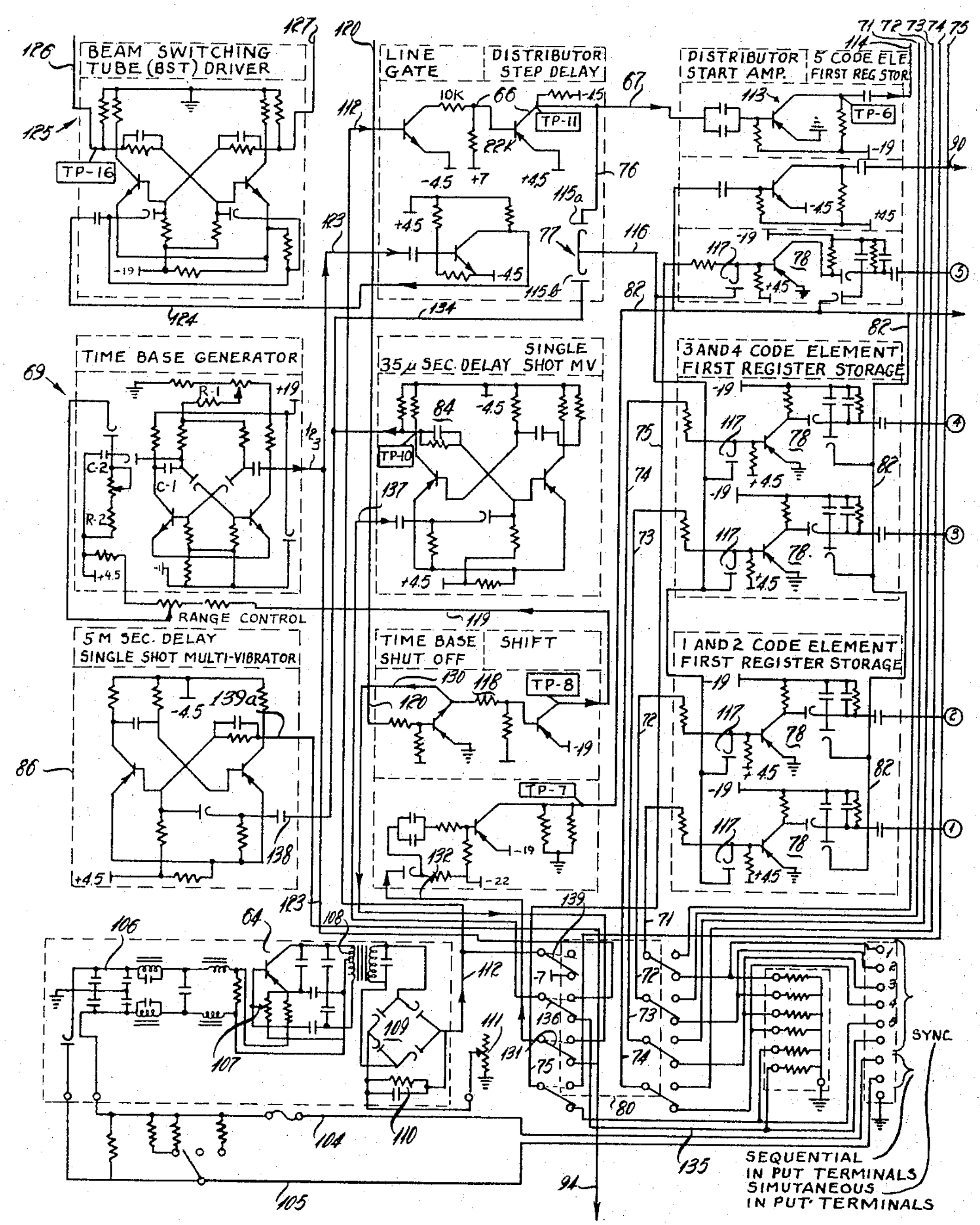
Figure 10B:
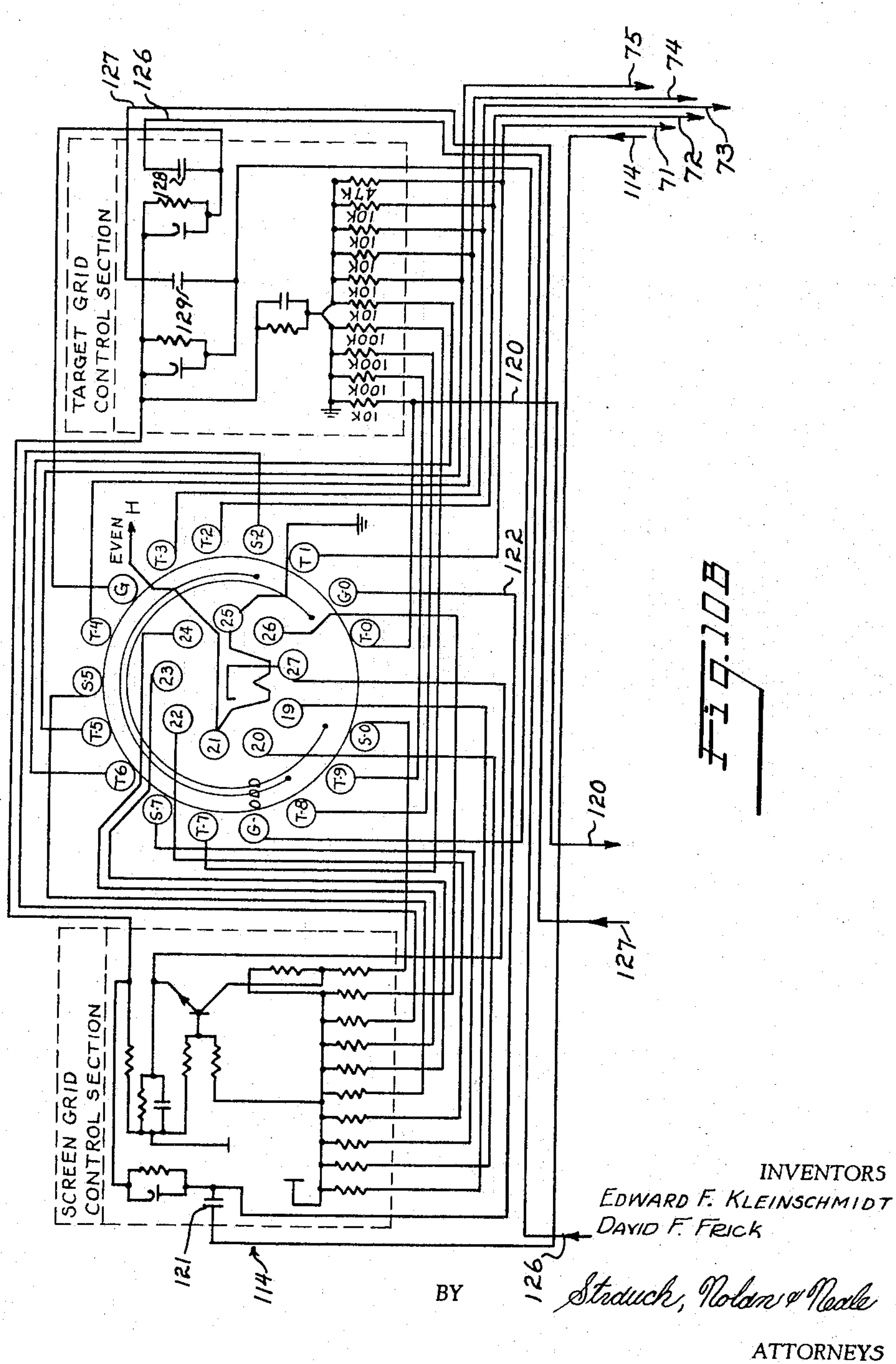
Figure 11:
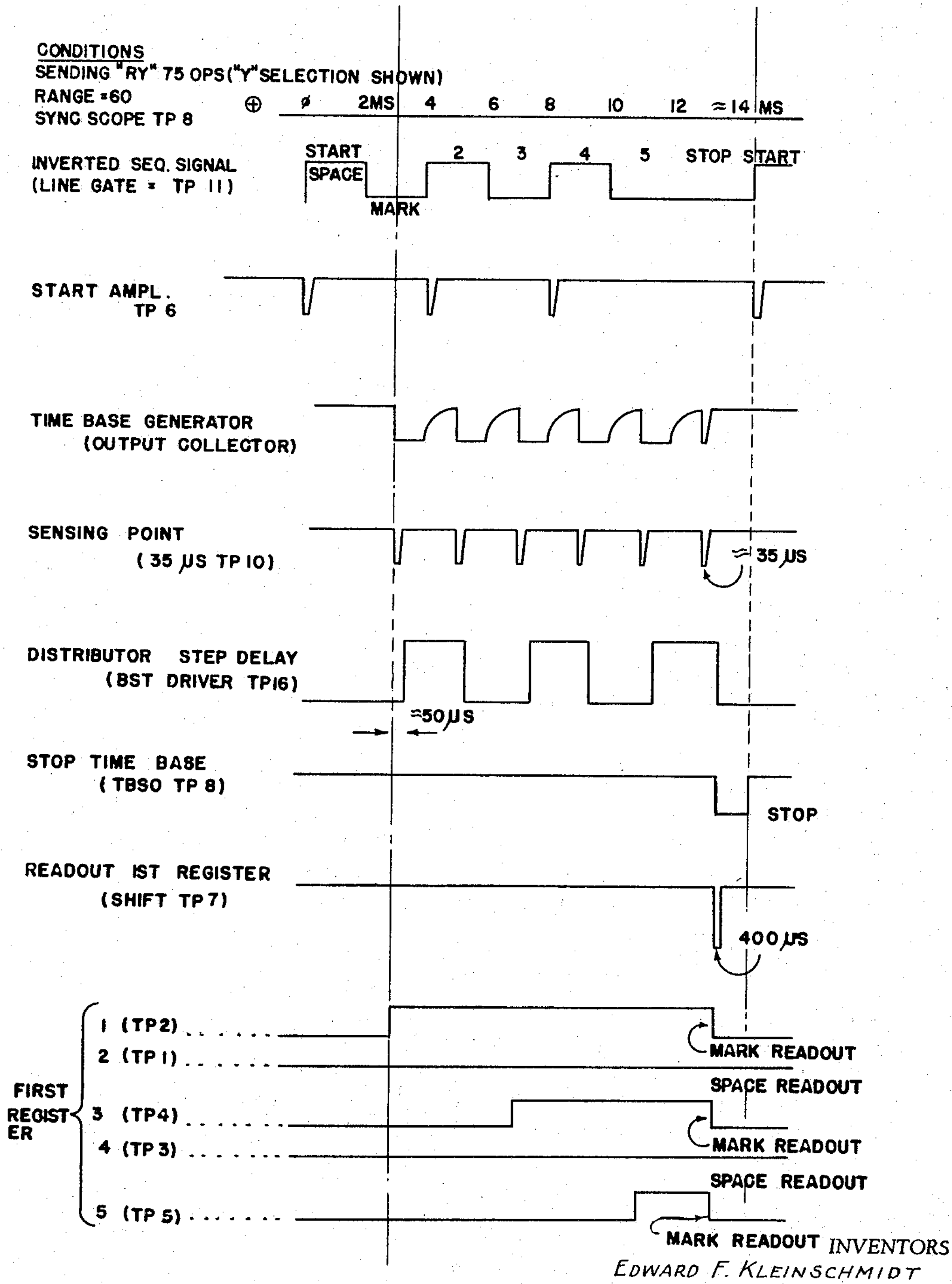
Figures 12, 20:
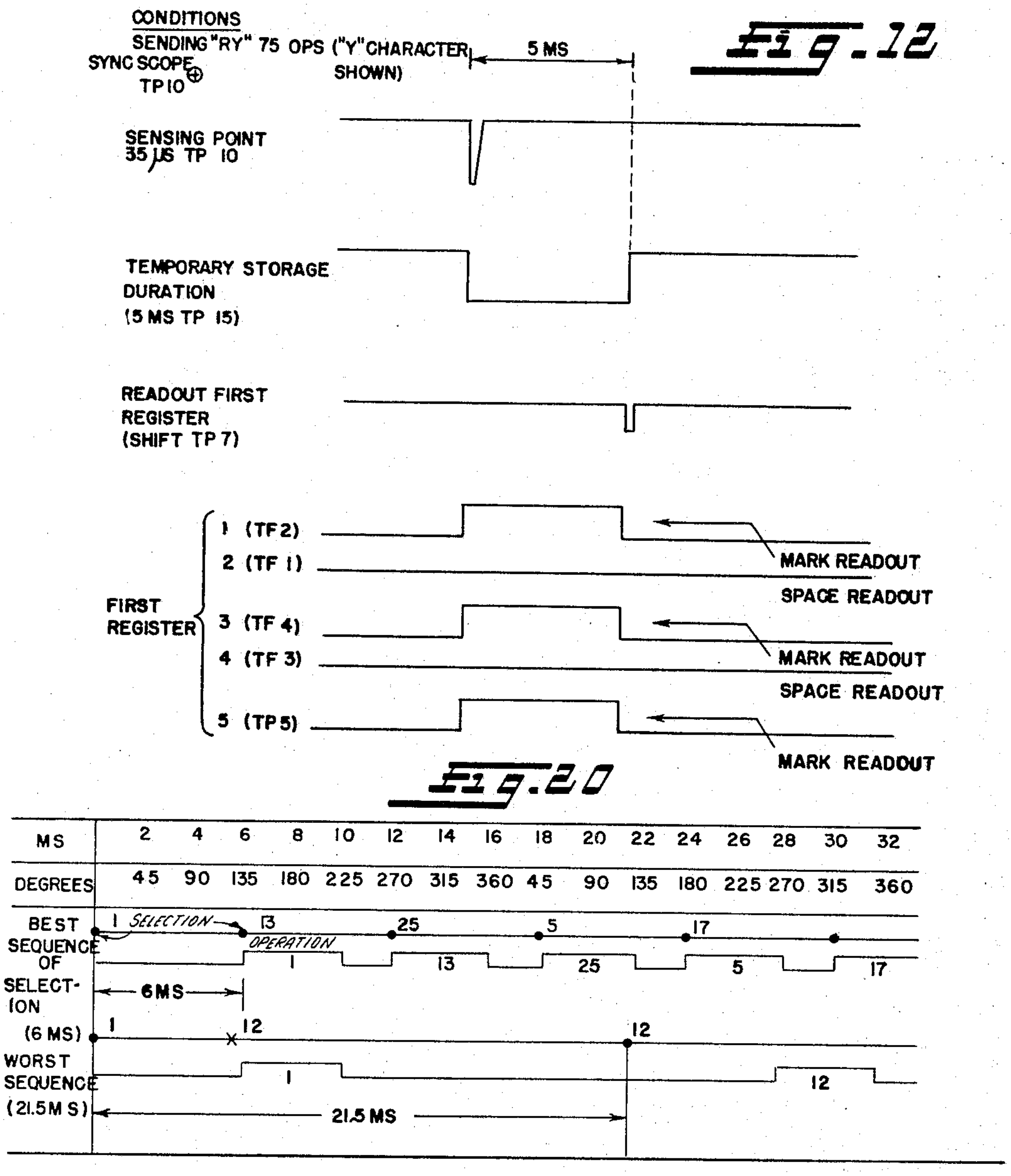
Figure 13:
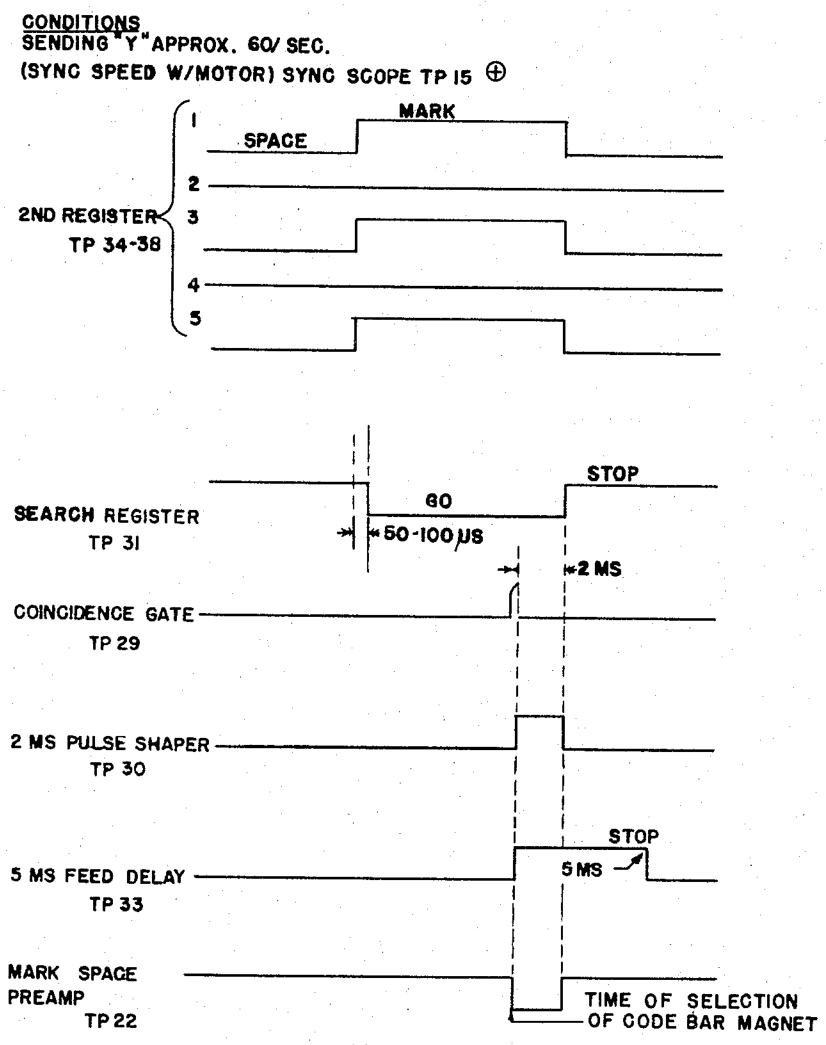
Figure 14:
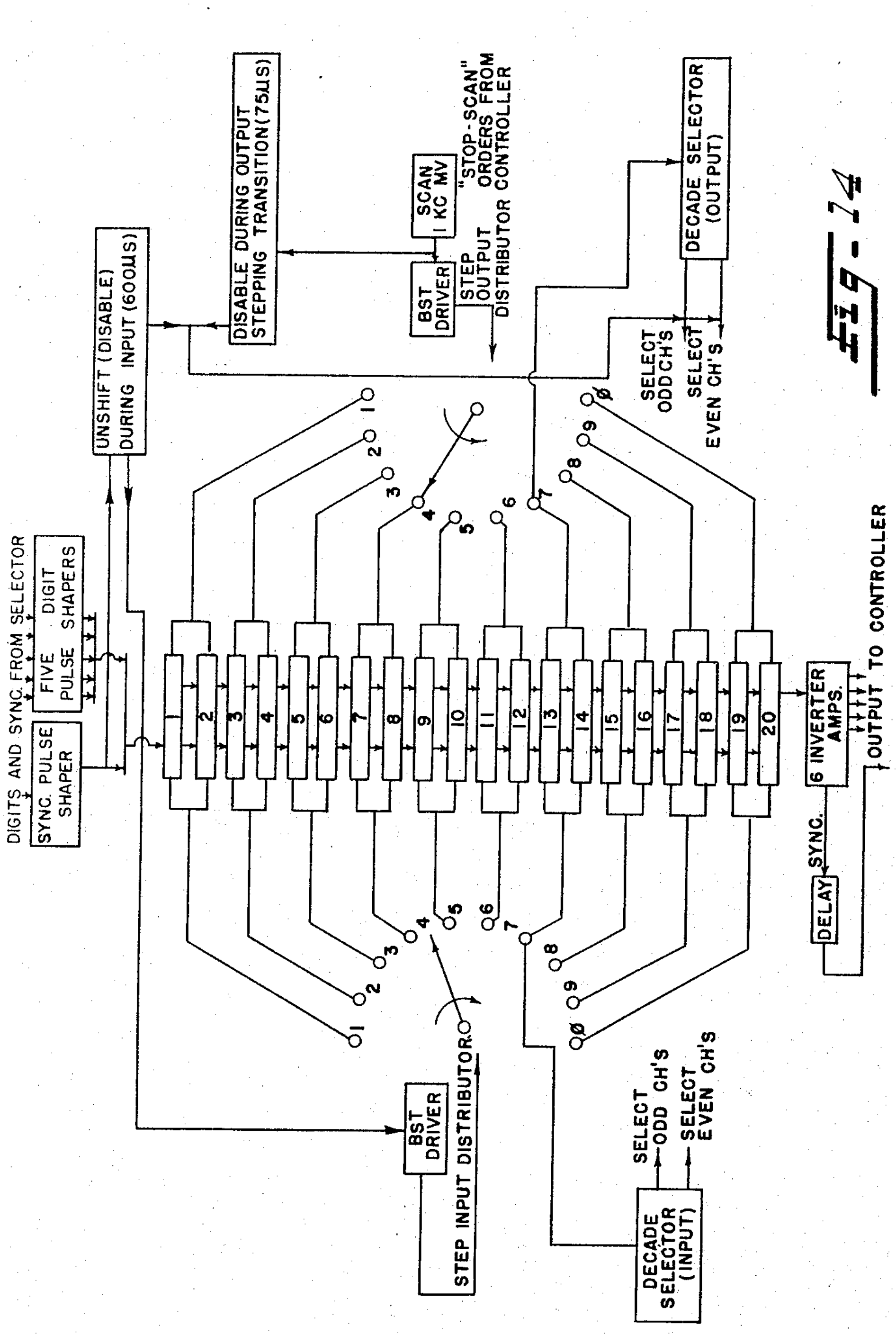
Figure 15:
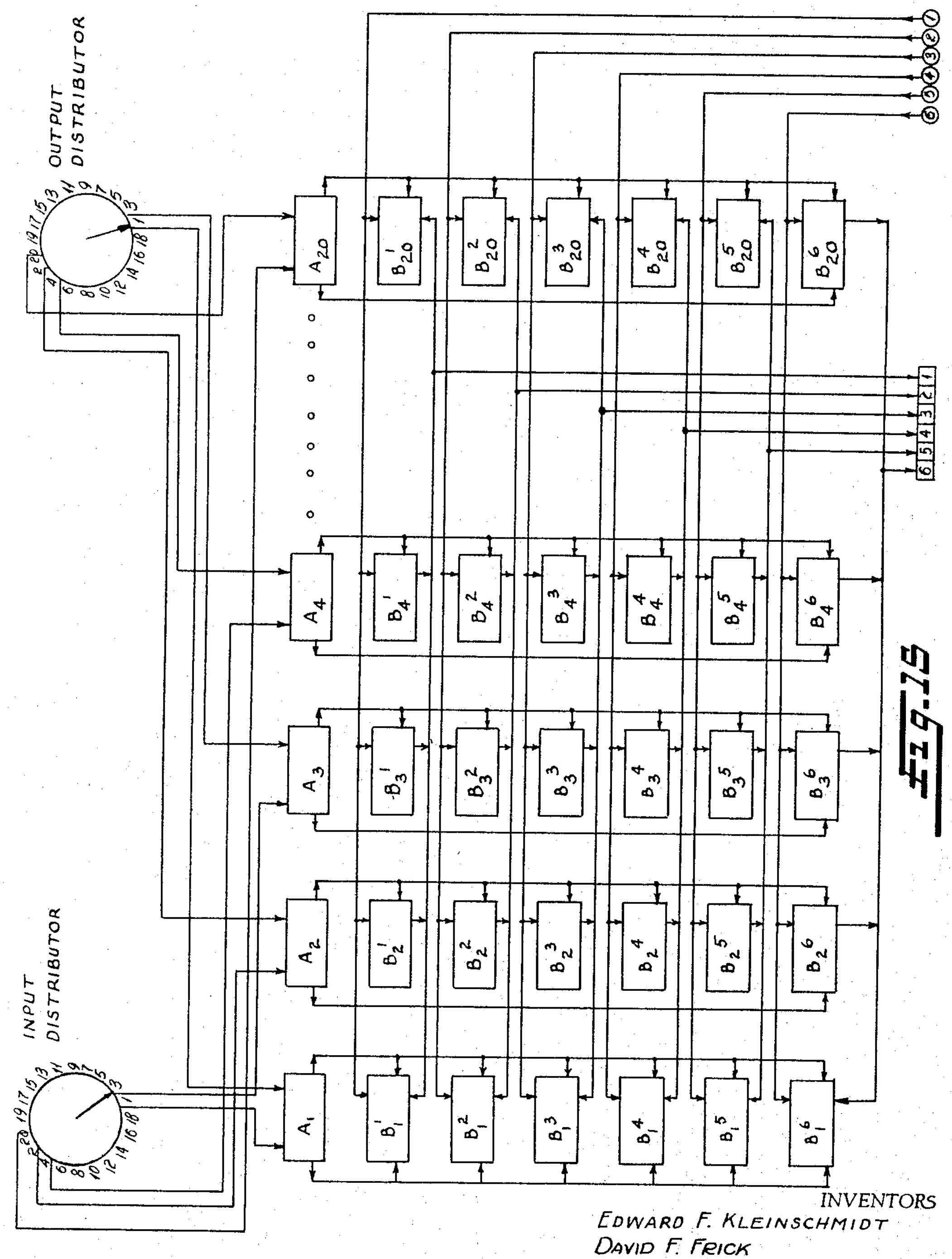
Figure 16:
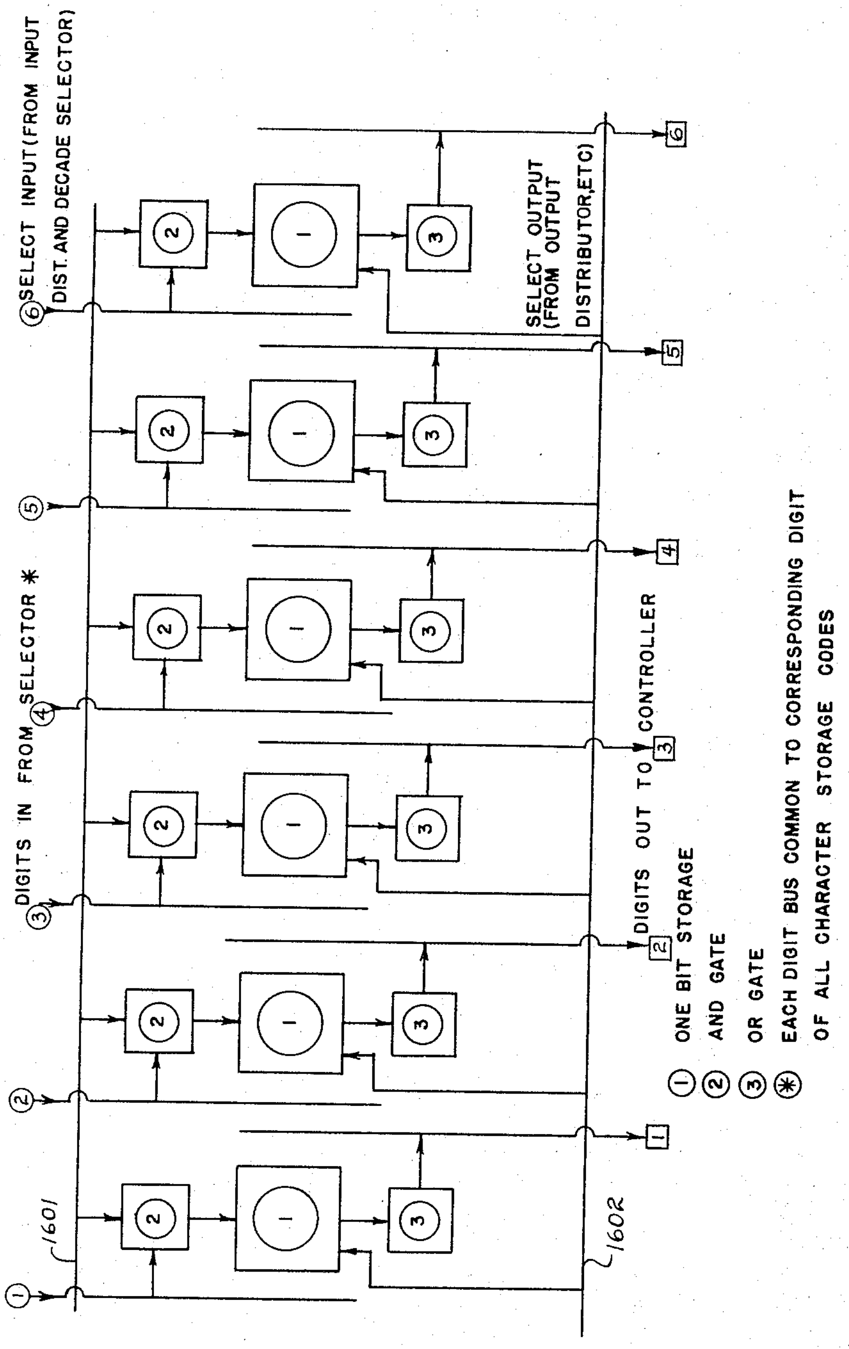
Figures 17, 19:
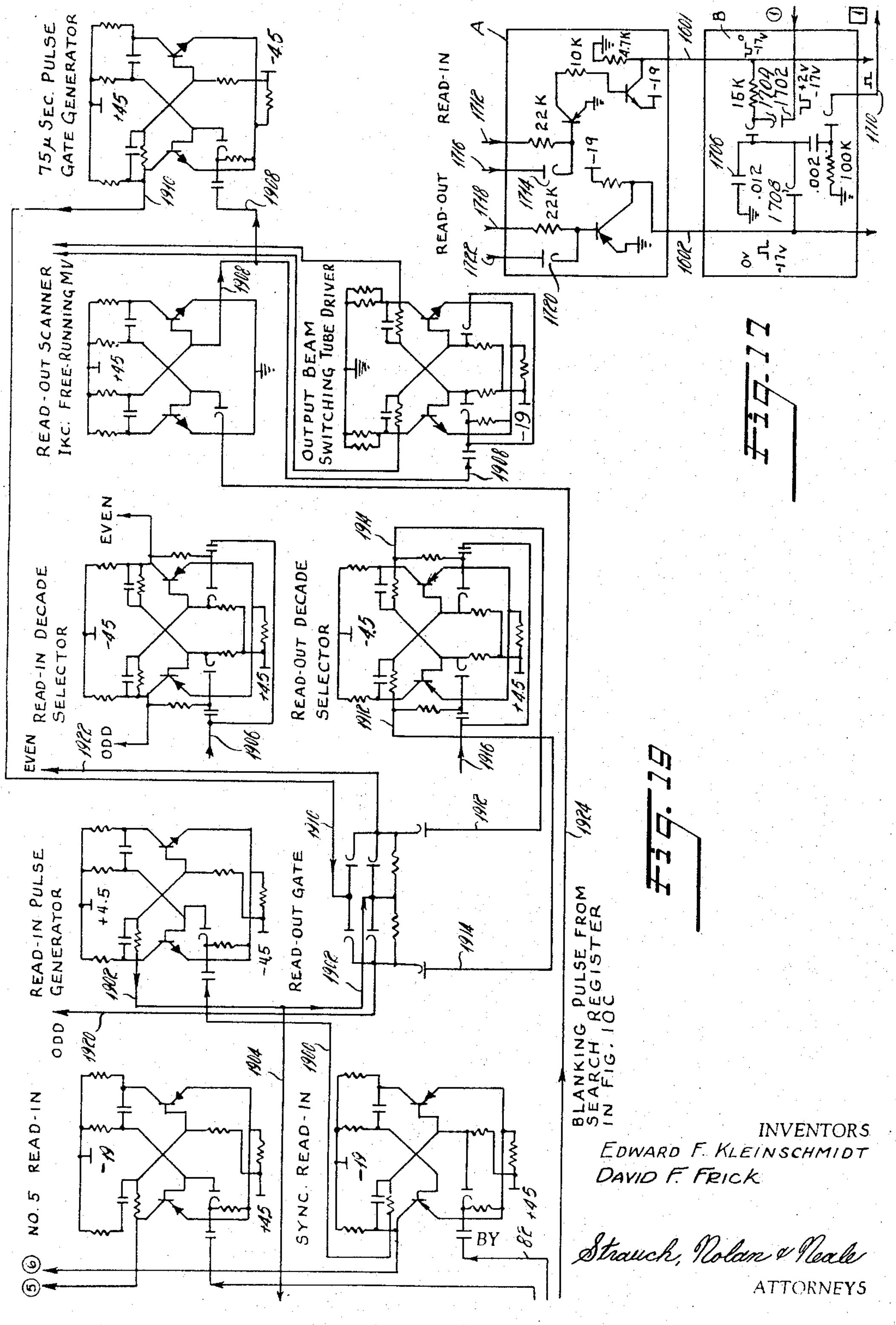
Figure 18:
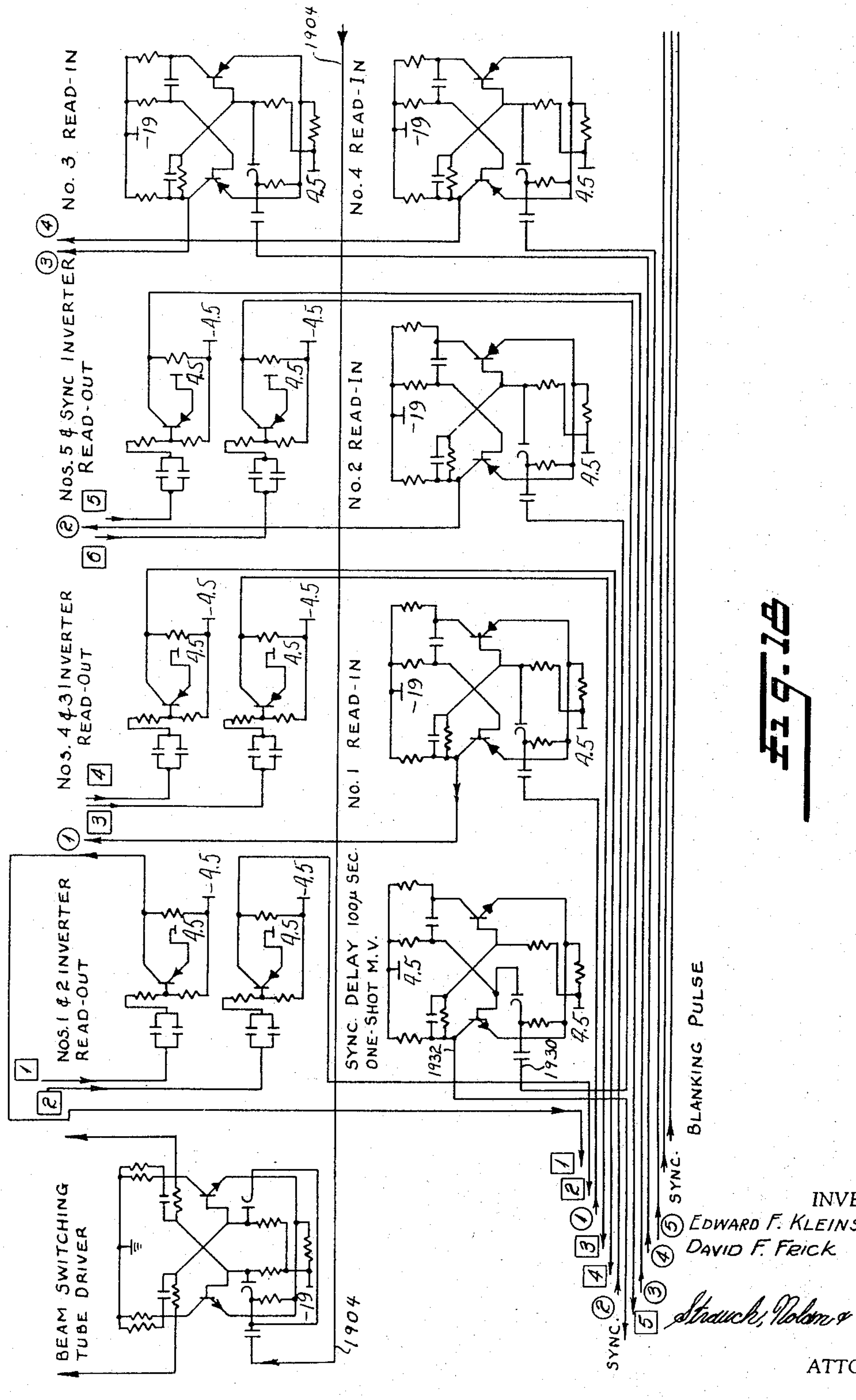

FIGURES 10A, 10B, 10C, 10D, 10E and 10F together comprise a detailed circuit diagram of a transistorized circuit corresponding to the block diagrams of FIGURES 7, 8 and 9;

FIGURE 11 is a timing chart for the various circuit stages in the converter unit of FIGURES 10A and 10B when set to receive sequential input signals;

FIGURE 12 is a timing chart for a converter unit of FIGURE 10A when set to receive simultaneous input signals;

FIGURE 13 is a timing chart illustrating various of the voltage signals present in the various circuit stages of the controller unit shown in FIGURES 10C, 10D, 10E and 10F;

FIGURE 14 is a block diagram of the storage unit which may optionally be inserted between the converter unit of FIGURE 7 and the controller unit of FIGURES 8 and 9;

FIGURE 15 is a more detailed block diagram of the storage unit showing how the various storage channels are electrically interconnected;

FIGURE 16 is a diagram of one storage channel in the storage unit;

FIGURE 17 is a detailed circuit diagram of a single stage in the storage unit;

FIGURES 18 and 19 together comprise a detailed circuit diagram of the input and output control circuits to the storage unit; and FIGURE 20 is a mechanical timing chart on code rod selection and resulting reperforator operation.

GENERAL DESCRIPTION

Figures 1, 2:
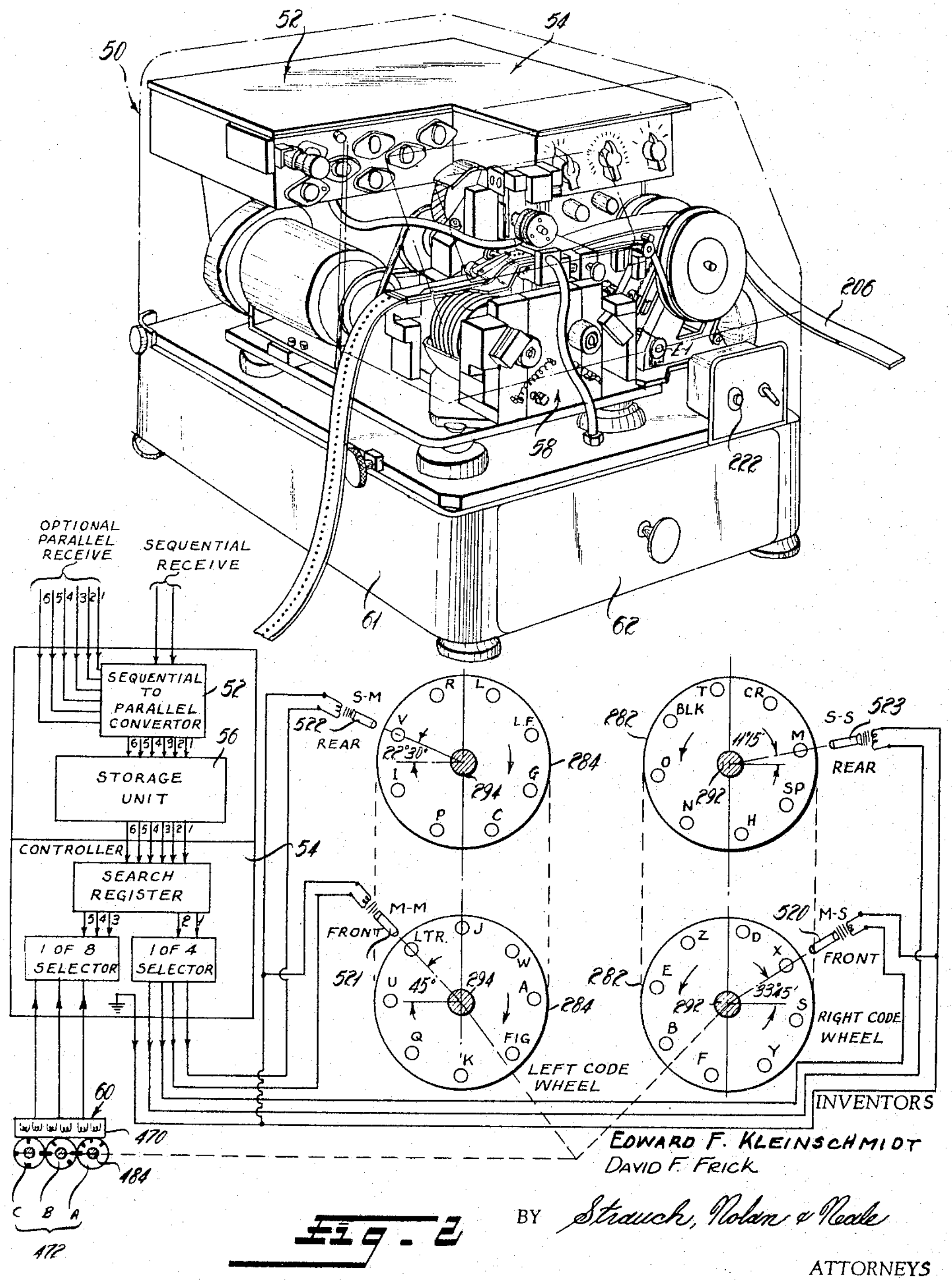
FIGURE 1 illustrates a complete receiving printer-reperforator assembly incorporating this present invention. The cover of the assembly is illustrated in phantom lines to enable a general view of the relative disposition of the reperforator components, many details being omitted from this view for clarity.
FIGURE 2 is a schematic block diagram representing subcomponents of the unit shown in FIGURE 1 and also illustrating, in a general way, the manner in which the electronic and mechanical subcomponents cooperate.

In the high speed electronic mechanical printer-reperforator, all components are housed in a single unit 50 illustrated in FIGURE 1. This printer-reperforator unit 50, with reference to the schematic FIGURE 2, consists of several basic components some of which are electronic and others of which are electrical-mechanical. Actual printing and perforating operations are of a mechanical nature although powered by a continually operating electric motor. Mechanical code combination representations are contained on a plurality of code rods which, during the machine operation, are in continuous rotation as distinguished from the normal start-stop operations of known printing-reperforators, used prior to this invention. The mechanical printing and punching components of reperforator unit 50 are coordinated with the electronic receiving and control components through an electronic coincidence circuit which actuates, in an electro-magnetical manner, selection of a code rod representative of a received electrical code signal combination.

In FIGURE 2, where the basic components of the control portion of reperforating unit 50 are illustrated schematically, it will be seen that the incoming electrical manifestation of code combinations (the example used being the standard Baudot Code) may be received by a sequential to parallel converter unit 52 through a two line sequential system or through a six signal line parallel system, five lines of which are for the different code manifestations and the sixth line for a control or sync signal. From converter unit 52 the signals are electronically transferred to a controller unit 54 or to a storage unit 56, if the latter is being used. As will be described in detail hereinafter, use of storage unit 56 is optional and will depend on the line speed, i.e., the rate of incoming code combination signal impulses received by converter unit 52. As an example, a line speed of 40 or fewer operations per second is sufficiently low to assure that the worst time of sequential selection by the mechanical unit enables handling of the message without need for the storage unit. On the other hand, if the incoming rate is raised to 75 operations per second (o.p.s.), the contemplated design speed, the mechanical operating time requirements for certain character selection sequences in the mechanical operation exceeds the fixed 13.3 milliseconds between successive characters for a 75 o.p.s. rate. Utilization of the storage unit permits an intermittent back-up in mechanical utilization of any signals from the controller, the sequence of which the mechanical part of the reperforator cannot process at the line frequency.

Electrical signals from controller unit 54 select a desired code rod, corresponding to the received code signal, in the printing-reperforating component 58. A tie-in control between the mechanical printer-reperforator component 58 and the controller 54 is provided through a rotary coincidence selector 60 operated in direct rotational relationship to rotation of the code rod wheels for the printer-reperforator component 58. Mechanical details of the printer-reperforator 58 and the coincidence selector 60 are not per se a part of the invention herein. Detail descriptions thereof may be found in the aforenoted parent application.

Operation of the complete machine 50 requires absolute correlation between the mechanical and electronic components. To obtain an ultra high speed (4500 o.p.m.) in the mechanical selection, printing, punching and tape feed, a plurality of small rigid code rod elements are mounted on a continuously rotating wheel. An operational theory of transfer of energy by elastic impact is utilized to obtain rapid cyclic mechanical movements. These noted factors provide a very important advantage in that the code rod "wheel," if desired, can be divided into two wheels, each wheel containing sixteen of the thirty-two code rod elements needed to represent individual code combinations of the Baudot Code. Impact forces necessary to perform the printing, punching and tape feeding operations can all be derived from the kinetic energy of rotation of these operating wheels. Finally, the electro-mechanical mechanism which selects and shifts a desired rod in an axial direction within either one of the operating wheels, can be controlled more easily by providing selecting devices on each side of each wheel. This mechanical selecting arrangement enables a division of the 32-unit Baudot Code into 4 groups of 8 units each, thereby increasing the mechanical selection operating time by a factor of 4. Even so, if a larger code group such as a 64 character code is desired, then (1) four code wheels each carrying a 16 character group can be used or (2) means can be provided for shifting the type wheel which is provided with two rows of characters. This latter method is utilized and specifically described in the following description.

Having divided the Baudot Code system into four groups of eight units, each group having the code rods corresponding to its included character unit equally circumferentially spaced around the peripheral rim of a code wheel, selection of a specific code rod element resolves into a combination of a one-out-of-four and a one-out-of-eight selection. The one-out-of-eight selection is directly related to eight angular positions of the eight code rods in each group about the 360° circumference of the associated code wheel. Although the four selection points for all four groups are mechanically offset as is apparent from FIGURE 2, they are coincided on a time basis by the displacement of the magnets and pick-up coils.

Coincidence of this angular phase relationship with specific code combinations is accomplished by an electronic-electrical-mechanical tie-in between the printer-reperforator and the electronic controller unit which compares and matches the last three units of a received five unit Baudot Code combination with a corresponding three unit signal related to the code wheel eight position rotational phase. At every one of the eight phase positions of the code wheels, there are four code rod elements which could be selected. The electronic controller determines which one of the four code rods will be selected in accordance with a one-out-of-four signal represented by the first two impulses of a Baudot Code.

Figure 3:
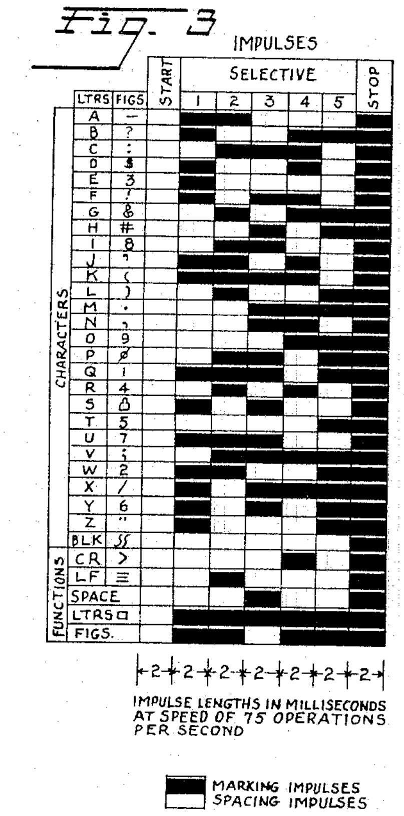
FIGURE 3 is a chart of the five-unit Baudot telegraph code including the print symbols and functions assigned to each code combination.

FIGURE 3 is a chart illustrating all of the characters in the five unit Baudot Code. In breaking this code into four groups (represented by FIGURE 4), it will be seen that in eight of the 32 code combinations, the same first two impulses occur. In other words, in one group the first two code impulses are mark-mark impulses; in a second group the first two code impulses are mark-space impulses; in the third group the first two impulses are space-mark impulses; and in the fourth group the first two code impulses are space-space impulses. The eight characters in each of these four groups have eight different 3-unit code impulses constituting the last three code impulses of the Baudot Code. These same eight different 3-unit code combinations appear in the same sequence in the arrangement of each of the four groups, this similarity being depicted in FIGURE 4. Variations of the code may be used. However, if the sequence of characters is changed in one group, it must be changed in every group.

Figure 4:
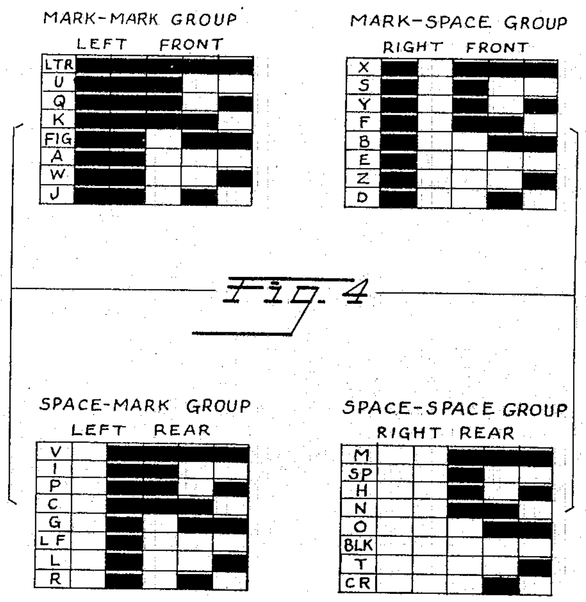
FIGURE 4 is a breakdown of the standard Baudot Code into four groups, each of which groups has the same first two code impulses for all of the code combinations in that group.
Figure 6:
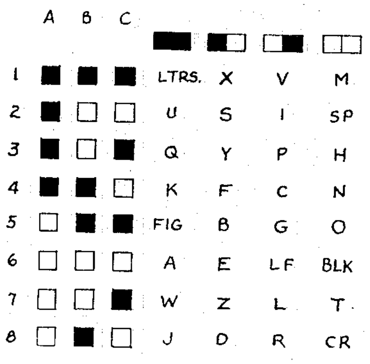
FIGURE 6 is a chart derived from the four group breakdown of the standard Baudot Code of FIGURE 4 to further illustrate the manner in which a one-out-of-four selection of the first two units of the five-unit Baudot Code can be matched with a one-out-of-eight selection of the last three units of the five-unit Baudot Code.

The chart in FIGURE 6 is developed from the four groups shown in FIGURE 4, the four vertical rows of characters representing the four groups of code combinations repesented by mark-mark, mark-space, space-mark and space-space. These four groups are the ones which will be controlled by the one-out-of-four selector in the electronic controller (see FIGURE 2). In FIGURE 6 the eight horizontal lines contain four characters, each of which is represented by the same 3-unit code combination of the least three code elements in the Baudot Code. The code rods for each four characters of these eight groups are located sequentially around the periphery of an associated code wheel at 45° increments. To accurately determine the eight positions of rotation of the code wheel or wheels, a rotating coincidence selector is rotated in direct relationship to rotation of the code wheels. The rotor of the coincidence selector includes permanent magnets operatively associated with fixed pick-up heads. As will be later described in detail, the output signal from the pick-up heads provide 3-unit code signals corresponding exactly to the last 3 code elements of the code combination in the Baudot Code at each of the eight angular positions of the code wheels. Thus, insofar as the mechanical appartus is concerned, we have a means for determining the exact point at which any one of the eight rotational angular positions passes a given point. If at that time we are able to select one of the four groups represented by the mark-mark impulses, mark-space impulses, space-mark impulses and space-space impulses, only one code combination character will be selected.

Returning now to FIGURE 1, the aforedescribed components of printer-reperforator 50 are arranged in small compact subassemblies integrated in a unit occupying approximately one and one-half cubic feet and having a total weight of approximately 50 pounds. The printer-reperforator component 58 occupies the center and forward portions of unit 50, coincidence selector 60 being a mechanical portion of this component. Located at the rear-upper portion of reperforator 50 is a box containing converter unit 52 and controller unit 54. The lower base portion 61 of reperforator 50 has space for the storage unit 56 and a front chad drawer 64.

Incoming five unit Baudot Code signals are received by the converter unit 52 and are then transmitted through the storage unit to the controller 54. However, when the storage unit is not used, a dummy plug permits the code signals to be transmitted directly to the controller.

The electronic five unit code signal is split into two groups in the search register, the first being indicative of the first two units of the code which is then applied as one input signal to a first "and" gate which drives one of four magnets, deisgnated SM (space-mark), MM (mark-mark), SS (space-space) and MS (mark-space) in FIGURE 2. The last three units of the five unit incoming signal and the electrical phase position relationship of the code element carrying wheels of the mechanical printing and perforating unit 58 are compared by means of a one-out-of-eight "and" gate. The output signal from the one-out-of-eight "and" gate is applied as another of the input signals to the first "and" gate to operate the one selected magnet, SM, MM, SS or MS at the proper time interval in the cycle of rotation of the wheel carrying the code rods. From the time of this code rod selection, actual printing and perforating operations, which are essentially mechanical functions, occur while the output of the electronic system is blocked for the next 5 milliseconds.

ELECTRONIC SELECTOR AND CONTROLLER DESCRIPTION

*Block diagrams*

Turning now to FIGURES 7, 8 and 9, a functional block diagram of the electronic portion of the printer reperforator of the present invention is shown with the storage unit 56 as indicated in FIGURE 2 removed. In FIGURE 7, the sequential signal input line is connected to supply input signals to line oscillator 64, the function of which is to operate line gate 66 which provides a reproduced input signal having a sufficiently good wave shape to improve the reliability of operation of the electronic system. Also, as will be pointed out in the discussion in connection with FIGURE 10B, the line oscillator 64 and line gate 66 provide complete isolation of the electronic circuitry in the reperforator apparatus from the incoming lines.

An output signal from the line gate is applied on lead 67 to distributor 68 at the beginning of the reception of each five code element signal. The distributor 68 is advanced at a frequency determined by the frequency of operation of time base generator 69, the output of which on lead 70 controls the advancement of the distributor to provide selective output signals on leads 71, 72, 73, 74 and 75 at time intervals corresponding to the time intervals of reception of the sequential five element code through line gate 66. The five electrical signal impulses of the code are also applied sequentially on lead 76 to one input of "and" gate 77. The other input signal to "and" gate 77 is on lead 134 from a 35$\mu$ second delay multivibrator 84 which is triggered by an output signal from time base generator 69. With the improved wave form provided at the output of line gate 66 and the precise timing of the control signal delayed by 35$\mu$ seconds from circuit 84, the output signal from "and" gate 77 is such as to assure reliable operation throughout the remaining circuitry.

The output signal from "and" gate 77 is applied as an input signal to each of the "and" gates designated 1, 2, 3, 4 and 5, respectively, on lead 116. When the No. 1 code impulse appears on lead 76, only the No. 1 "and" gate is open while the Nos. 2, 3, 4 and 5 "and" gates remain closed. An electrical signal corresponding to whether the first code element is a mark or a space is thus transmitted to the No. 1 first register storage stage 78.

At the time the No. 2 code element appears on lead 116, the time base generator 69 has advanced distributor 68 to the point where the output signal from the distributor is on lead 72 which opens the No. 2 "and" gate to thereby permit the No. 2 first register storage stage 78 to receive a voltage corresponding to a mark or space signal in the No. 2 code element position. At this point in time, the "and" gates for the Nos. 1, 3, 4 and 5 code element signals remain closed.

Distributor 68 continues to advance in a cyclical manner providing a pulse shaped output signal on leads 73, 74 and 75 successively at time intervals corresponding to the appearance on leads 76 and 116 of the signals corresponding to the Nos. 3, 4 and 5 code elements. At the end of a cycle of operation, the first register storage stages 78 make available all five of the code signal elements of a single character of the Baudot Code for simultaneous processing throughout the remainder of the electronic circuitry.

The time base oscillator 69 is a fixed frequency oscillator with separate plug-in RC combinations available to match the output frequency with the signal frequency used on the sequential line input to line oscillator 64. This enables the speed of the present invention to be matched with the message signal speed over the teleprinter line. After distributor 68 has completed one cycle, it initiates a stop bias signal to time base oscillator 69 whereby both remain in a rest condition until a new start signal is received over lead 67 from line gate 66.

The contents of the first storage register is read out in parallel. A read-out signal is provided on lead 82 from the first register read-out stage. This signal is generated during the sequential mode of operation at the time the stop bias signal is provided from the distributor to the time base oscillator 69 after the fifth signal code in it has been received. The actual read-out pulse is delayed slightly to assure that the No. 5 first register storage circuit has reached a stable status.

A sequential-simultaneous mode selector switch 80 is provided having a plurality of contacts which are mechanically interconnected. In FIGURE 7, these contacts are in a position adapted for receiving the sequential signal. The contacts of switch 80 when transferred to their alternate position adapt the present invention to receive the five code elements of the Baudot Code simultaneously from five different signal channels along with a control or sync signal on the sixth signal channel as shown in FIGURE 7. When the simultaneous mode of operation is used, distributor 68, time base oscillator 69 and several of the associated circuits are not used. The input signal to "and" gate 77 from line gate 66 is replaced by a signal voltage, is continuously an open signal and the control sync pulse triggers the 35$\mu$ second delay circuit to thus open "and" gate 77 almost immediately upon receipt of the incoming signal. The input signals on each of the lines marked 1 to 5 are then transmitted directly into the corresponding first register storage stages 78.

For the simultaneous mode of operation, the control or sync signal accompanying the Baudot Code signals is applied through line sensing one shot multivibrator 84 which provides a 35$\mu$ second delay and through five millisecond delay one shot multivibrator 86 to the first register read-out stage. After the read-out signal on lead 82 is applied to each of the first register storage stages 78, these stages are in condition to receive the next incoming signal code elements. The signal transmission in the simultaneous mode may be at any speed up to the maximum design speed of the equipment and no adjustments or changes are required for varying signal transmission rates.

FIGURE 8 is a functional block diagram of the controller unit which contains five second register stages 88 that receive as input signals the output signals of the first register storage stages 78 from FIGURE 7. The controller unit of FIGURE 8 requires varying time increments for operation depending upon the particular sequence in which successive characters are received in the message. As will be explained below the controller unit is cleaned out to be ready for the next signal when it arrives.

After the code element signals are stored in the second register stages 88, a slightly delayed read-out sync signal is applied to the search register stage in the controller unit as shown in FIGURE 8 from lead 90 which is derived from the first register read-out stage of the receiver-selector unit shown in FIGURE 7. The output signal from the search register on lead 91 is applied to open the shaft position coincidence detector (one-out-of-eight) to condition this circuit so that upon the proper coincidence of signals from the Nos. 3, 4 and 5 second register stages 88 and the output from the pick-up coils from sections "A," "B" and "C," an output signal will appear on lead 92. Instantaneously upon receipt of the incoming signal to the second register storage stages 88, the outputs from the No. 1 and the No. 2 second register stages are applied to the one-out-of-four "and" gate to condition one of the selector magnets MM, MS, SM or SS to be selected at the moment when time coincide is registered by the shaft coincidence detector.

The output signal from the 2 millisecond gate pulse generator is applied directly as the last input to the one-out-of-four "and" gate to thereby trigger the correct selector magnet. At the same time, this signal discards the code then stored in the second register storage stages 88 by triggering these stages back to a no signal condition to place the second storage register in a condition to receive the next coded signal.

The output signal from the 2 millisecond gate generator is further applied by lead 93 to a five millisecond feed delay stop gate which is a single shot multivibrator. The output signal from this circuit prevents the shaft position coincidence detector from registering a coincidence output signal during the 5 millisecond gating time interval to enable the mechanical apparatus to perform the functions of perforating and printing the previously transmitted signal on the tape. During this interval, the next coded signal is received by the second register storage stages 88 so that the controller unit is ready to supply the next signal to the mechanical unit as soon as the preceding character has been processed.

At the end of the 5 millisecond delay, the shaft position coincidence detector will be unblocked and the mechanical apparatus will be ready to process the next character. However, if the next coded signal is not yet present in the second storage register stages, the search register will provide on lead 91 an inhibit signal that prevents an output signal from appearing on lead 92 from the shaft position coincidence detector circuit.

One of the novel features of the present equipment is the provision for manual tape feed-out, and an override feature which prevents further tape feed-out in event an incoming signal should appear. Manual depression of the tape feed-out push button 222 results in a transfer of the condition of the blank feed-out register circuit, which may be a bi-stable Eccles-Jordan type circuit, to provide an enabling signal to the shaft coincidence detector whereby a coincidence is indicated at a position corresponding to a code having 5 spaces to thereby advance the tape once each rotation of the code wheel shaft 292. Each time an input signal is received, the 35$\mu$ second delay circuit 84 (see FIGURE 7) produces an output pulse on lead 94. This signal will appear on lead 94 (see FIGURE 8) as the input to the blank feed-out register stage to override the effect of the manual tape feed button 222 and stop the tape feed-out operation so that none of the incoming signals will be lost.

FIGURE 9 shows the circuit diagram for controlling operation of various other auxiliary functions in connection with the operation of the reperforator unit. The type wheel of the printer unit contains two rows of thirty-two characters each, one row being designated letters and the other row being designated figures. The type wheel is shifted axially via electro-magnets when current passes through one or the other of the electro-magnet coils and remains in the selected position until again shifted.

As is apparent from FIGURE 3, the code for both LTRS and FIG starts and ends with two marks, the sole difference being in the No. 3 code element. Code elements 3, 4 and 5 are used as inputs to multiple "and" gates stage 96 shown in FIGURE 9 to selectively energize either the FIGS SHIFT CURRENT AMPLIFIER 97 or the LTRS SHIFT CURRENT AMPLIFIER 98 to momentarily energize the corresponding FIGS or LTRS SHIFT magnets and shift the printing wheel accordingly.

With continued reference to FIGURE 9, the signal bell is operable when the printing wheel is in the figures position and the letter S is transmitted. The bell is caused to ring by the energization of the current coil of an electromagnet by current amplifier 100 which is energized from the output of multiple "and" gate circuit 101. The inputs to multiple "and" gate circuit 101 include a signal indicating the first two code elements are mark-space and the outputs from the Nos. 3, 4 and 5 second register stages 88 corresponding to "S," which as shown in FIGURE 3, are mark-space-space. In addition to foregoing code elements, mulitple "and' gate 101 also requires a signal from a case register memory stage which is a bi-stable device that supplies the necessary signal only when the figures shift magnet is the last to have been energized and the type wheel has been shifted to the figures row of characters.

One further auxiliary function is that of controlling the ribbon feed and its direction of feed. As it is desirable to have the ribbon feed only during periods of operation of the reperforator and printer unit to provide uniform wear on the ribbon, electronic circuit means are provided for selectively energizing the ribbon feed clutches, there being one for each direction of rotation of the ribbon feed spools as shown in FIGURE 9. Each time a character is punched or printed by the perforator unit, an output signal from the 2 millisecond gate pulse generator in the control unit shown in FIGURE 8 is applied through lead 93 to a one second sustained circuit shown in FIGURE 9. This circuit comprises a large condenser which discharges through a relatively large resistance and has a time constant sufficiently long so that its output signal is sufficient to operate "and" gates 102 and 103 for a period of about one second. In the event an operator is manually typing a transmitted signal, the ribbon feed will be continuous so long as letters are transmitted at a spacing of no greater than one second. Once an interval greater than one second occurs during which there is no signal received, "and" gates 102 and 103 are closed and the ribbon feed clutch magnets are de-energized to thereby stop the ribbon feed. As soon as a signal is received, one of the "and" circuits 102 and 103 is immediately gated open and the appropriate ribbon feed clutch magnet is then again rendered operable.

In order to assure continuous feed of the ribbon in the desired direction, a ribbon direction register is provided which, as will be explained below, provides an output signal to only one or the other of the "and" circuits 102 and 103, depending upon the direction of the ribbon feed. The ribbon direction register thus serves as a memory to thereby cause the ribbon to continue movement in the same direction which it had been previously running.

*Detailed circuit diagrams*

A circuit diagram of a transistorized circuit of the receiver-selector, which largely is a sequential-to-parallel signal converter (see FIGURE 7) and of the controller (see FIGURES 8 and 9) is shown in FIGURES 10 A, B, C, D, E and F. Where possible, reference numerals and block diagram labels used in FIGURES 7, 8 and 9 are used to identify corresponding parts in the detailed circuit diagram of FIGURE 10. While the drawings show the complete circuit of the reperforator, the following description will be directed to the principal parts only since the functions of the circuit components not mentioned will be obvious to those skilled in this art.

FIGURE 10A contains nine circuit stages surrounded by dotted lines plus at the bottom of the sheet the input terminals, sequential-simultaneous mode selector switch 80 and the line oscillator. Each of the circuit component designations that are inside a dotted line block represents the circuit components that are mounted on a card. In those instances where more than one circuit function is supplied by the components on a single card, the title block is divided with left-hand title designating the function of the components in the upper portion of the dotted line block. Similar designations are used in the circuit diagrams of FIGURES 10B through 10F.

Referring first to FIGURE 10A, the sequential-simultaneous mode selection switch 80 is, in this figure, shown in the simultaneous signal reception position. The following description will assume switch 80 to be in its alternate position and the sequential input signals to be applied over leads 104 and 105 through R-F filter 106 to line oscillator 64 which comprises a transistor connected as a Hartley oscillator operating at a frequency of approximately 200 kc. This oscillator circuit is unique in the sense that it is powered wholly by the energy of the input signal. No power supply or D.C. connection is provided between transistor 64 and the remaining components in the perforator unit of the present invention. When a mark pulse appears, the energy in the pulse is sufficient to cause the circuit to begin oscillating immediately and when the pulse terminates, the oscillations terminate, the threshold voltage level being adjustable by potentiometer arm 107. Transformer 1008 has its primary in the oscillator circuit and there is no D.C. connection between the primary and the remaining circuit. This provides a completely isolated secondary circuit in which coded signals of uniform amplitude are provided for further use in the reperforator unit.

R-F filter 106 is important in this equipment to prevent the 200 kc. signal of oscillator 64 from appearing on the input signal line. Suitable impedances across leads 104 and 105 are provided to match the various different line currents that are likely to be encountered.

The secondary of transformer 108 contains a full wave rectifier bridge 109, the output of which is connected across RC network 110 and variable resistor 111 to ground. Variable resistor 111 serves as a bias control for the newly generated sequential Baudot Code signals which appear on lead 112 to be supplied to line gate 66 at the upper center of FIGURE 10A.

The output signal from line gate 66 is connected via lead 67 to the start amplifier 113 for the distributor shown in FIGURE 10B. In effect, start amplifier 113 produces an output pulse on lead 114 every time there is a mark to space transition, which occurs between the end of the stop pulse and the beginning of the start pulse. If the distributor is already in the midst of a cycle of operation, then the output pulse on lead 114 is discarded. If the distributor is at rest, then an output pulse on lead 114 starts the distributor through a cycle of operation.

A second output signal from line gate 66 appears on lead 76 which is connected through "and" gate 77 composed of diodes 115*a* and 115*b*. The output from "and" gate 77 appears on lead 116 to five diodes 117 which are part of the "and" gates associated with each of the first register storage stages 78, as is shown in FIGURE 7. Through this circuit, each mark pulse is applied by lead 116 to each first register storage stage 78, but is accepted by only the one stage which is opened by the output signal from the distributor which is shown in detail in FIGURE 10B.

The output signal from the distributor appear on leads 71, 72, 73, 74 and 75, respectively, for the number 1, 2, 3, 4 and 5 code elements. The output signals from the first register storage stages 78 appear on leads marked in FIGURE 10A along the right margin ①, ②, ③, ④ and ⑤.

Since the five code elements of a sequential code occur at successive time intervals which depend upon the line speed of transmission, a time base generator 69 is provided for driving the distributor of FIGURE 10B. Generator 69 is basically a free running multivibrator having removable plug boards containing different sized capacitors and resistors for C–1, C–2 and R–1, R–2 to provide the proper frequency for the various different operational rates varying from 368.1 to 4500 operations per minute, i.e., about 6 to 75 operations per second.

Time base oscillator 69 is keyed on and off with the reception and completion of each sequential code by time base shut off circuit 118 which normally supplies a biasing signal through lead 119 to prevent oscillation by time base generator 69. Time base shut off circuit 118 receives its input signal on lead 120 from the distributor in FIGURE 10B. When the distributor in FIGURE 10B starts through a cycle of operation, a signal appears on lead 120 which produces the signal on lead 119 that unblocks time base generator 69. This unblocking signal continues until the distributor returns to its rest position at which time the blocking signal again appears on lead 120.

Referring now to FIGURE 10B, the distributor illustrated is a conventional beam switching tube which is commercially available. Other types of distributor circuits, such as the ring circuits used in counters which use either vacuum tubes or thyratrons may be used. The beam switching tube shown in FIGURE 10B was chosen primarily because the tube and its associated control circuits were readily available through commercial sources.

The tube has target elements designated T–0, T–1, T–2 . . . T–9. The electrode T–1 is connected to lead 71, electrode T–2 is connected to lead 72, electrode T–3 is connected to lead 73, electrode T–4 is connected to lead 74 and electrode T–5 is connected to lead 75. The remaining target electrodes T–6 through T–9 are not used in this equipment and are connected so that the beam in the tube advances without delay to its rest position on target electrode T–0.

On the right-hand side of FIGURE 10B are a series of 10K and 100K load resistors which are connected to the several target electrodes as illustrated, and on the left-hand side of the figure are the screen grid resistors which are connected in a conventional manner. Since this type of tube and its control circuits are well known to those skilled in the art, the detailed functioning of the tube will not be described other than to describe that part of its operation which is unique with this equipment.

The input pulse from start amplifier 113 in FIGURE 10A is applied through lead 114 which extends on to FIGURE 10B, through capacitor 121 and lead 122 to the beam switching tube grid element G–0. This causes the electron beam in the tube to advance off target electrode T–0. With the electron beam off electrode T–0, a voltage signal is produced on lead 120 which is supplied to time base shut-off stage 118 in FIGURE 10A to thereby provide the unblocking pulse on lead 119 to time base generator 69.

The output signal from time base generator 69 on lead 123 from time base generator 69 is applied upwardly along lead 123 to a distributor step delay stage. The output from the distributor step delay stage is on lead 124 and serves to trigger the beam switching tube (BST) driver stage, which is a bi-stable trigger circuit, into its alternate conductive stage with each successive pulse on lead 124.

The input signal to time base generator 69 on lead 119 is through a variable resistance designated range control. The purpose of the range control adjustable resistance is to provide an initial delay before time base generator 69 starts operation so that the first output signal on lead 123 that causes the beam switching tube to be advanced will be timed properly to advance the beam in the beam switching tube in FIGURE 10B to target electrode T–1 near the middle of the time occurrence of the first code element in the transmitted code. As is apparent from FIGURE 11, a delay of about 3 milliseconds is provided where the equipment is operating at the rate of signal transmission of 75 operations per second and the total time available to send the start space, the five mark-space permutations of the Baudot Code and the stop signal is slightly less than 14 milliseconds.

In FIGURE 11, a timing diagram is shown wherein the character "Y" has been transmitted. Each of the five code elements thus is present for a time interval of approximately two milliseconds as indicated in the top line of the timing chart. The second line shows the code element reversed so that the space code elements are indicated as a positive going pulse whereas the mark elements are indicated as a negative going pulse. The inverted wave form illustrated is available in the line gate stage 66 shown in the upper center of FIGURE 10A at a test point (TP) 11.

The third wave form shown in FIGURE 11 is the output of the distributor start amplifier 113 in FIGURE 10A, the voltage wave form being that present at TP–6. As pointed out above, each time there is a transition from a mark to a space, there is an output signal from TP–6 (see start amplifier stage 113 on FIGURE 10A) on lead 114. However, the only signal which is used by the beam switching tube in FIGURE 10B is that signal which appears when the beam switching tube is in its rest position with the beam at target electrode T–0. Any other pulses applied to grid G–0 are ineffective.

The fourth chart in FIGURE 11 shows the output from time base generator 69. This output signal has a sharp negative going edge which is adjusted to be near the center of the time interval of each of the five code elements of the Baudot Code. The first negative going pulse signal, however, is delayed by time base generator as explained above, before being applied to the beam switching tube driver through lead 124, by an amount to compensate for the width of the start space plus about the first half of the No. 1 code element in the Baudot Code. The remaining output pulses from the time base generator 69 appear in a proper timed relationship to trigger beam switching driver circuit 125 at the proper time interval.

The output signal on lead 123 from time base generator 69 is applied as the input signal to 35μ second delay single shot multivibrator on lead 137 through contact 136 (in its transferred position for the sequential mode of operation) of switch 80. The voltage wave form as shown in the fifth timing chart in FIGURE 11 is provided at the output of the 35μ second delay multivibrator (TP–10). This signal is produced at the repetition rate of the output signal of time base generator 69 and applied through lead 134 to diode 115*b* of "and" gate 77.

With continued reference to FIGURE 10A, the output leads 126 and 127 from the beam switching tube driver 125 shown in FIGURE 10B to be connected through capacitors 128 and 129, respectively, to the beam switching tube grid G–EVEN and G–ODD so that the alternating signals produced by the beam switching tube driver on leads 126 and 127 advance the beam inside the beam switching tube in a counterclockwise manner with the beam stopping at the target electrodes T–1, T–2 through T–5 for time intervals sufficient to apply the necessary pulse on leads 71, 72, 73, 74 and 75, respectively, which time interval is determined by the repetition rate of time base generator 69. As is apparent from FIGURE 10A, the signals on leads 71 through 75 pass through the transferred contacts of mode selector switch 80 to one input of the "and" gates 117 and the first storage register stages 78 in a sequential manner to cause a voltage condition to be stored in the first register storage stages 78 associated with the leads marked ①, ②, ③, ④ and ⑤ which corresponds respectively to the five signals comprising the incoming Baudot Code signal.

When the beam in the beam switching tube advances to its rest position at target T–0, a blanking signal is provided on lead 120 to time base shut-off stage 118 to thereby block further output signals from time base generator 69. As shown in FIGURE 11, the output signal from time base shut-off stage 118 at TP–8 comprises a negative pulse which extends until the next start pulse is received on the commencement of the next incoming code sequence.

A second output signal from time base shut-off stage 118 is provided on lead 130 which goes through the transfer switch contact 131 to lead 132. As shown in FIGURE 11, the output signal from TP–7 of the shift stage is a short negative going pulse which is applied to lead 82 (see FIGURE 10A) as a read-out pulse through the cathode of the diode in each of the five first register storage stages 78. This then makes available on the leads in FIGURE 10A at the right margin identified as ①, ②, ③, ④ and ⑤, a voltage impulse corresponding to the five code elements which have just been received.

*Simultaneous mode of operation*

For the following description, it will be assumed that a simultaneous input signal is received on the simultaneous input terminals marked 1, 2, 3, 4, 5 and sync. The contacts of switch 80 for this mode of operation are in the position illustrated in solid lines so that the mark signals which are transmitted as positive pulses will be supplied to "and" gates 117 of the first register storage stages 78 on leads 71, 72, 73, 74 and 75. The first register storage stages 78 are not opened, however, until a control pulse is present on lead 116 through "and" gates 117. The control signal on lead 116 comes from the 35 microsecond delay single shot multivibrator 84 through lead 134. The other input to "and" gate 77 is held open by a continuous positive voltage on the anode of diode 115*a* resulting from contact 139 of switch 80 being connected to negative 7 volt bias.

The incoming sync signal is applied through lead 135, switch contact 136 and lead 137 to the 35 microsecond delay single shot multivibrator stage 84. The negative going output signal at TP–10 from 35 microsecond delay single shot multivibrator 84, in addition to being applied through "and" gate 77, is applied through lead 138 to the input of 5 millisecond delay stage 86.

The timing chart in FIGURE 12 shows the time relation of the output signal at TP–10 in the 35 microsecond delay single shot multivibrator stage 84 and the signal at the first register storage stages 78 which receive the coded signals at that time interval. At the end of 5 milliseconds, an output signal appears on lead 139*a*, through switch contact 131 in its illustrated solid line position and lead 132 to the shift stage. The output signal at TP–7 of the shift stage on lead 82 is provided, as in the case of the sequential input signal, to effect a read-out of the signals stored in the first register storage stages 78 by making the voltage levels stored available on the terminals ① through ⑤ at the right-hand margin of FIGURE 10A.

Along with the output signals from the first register storage stages 78, the read-out signal on lead 82 is provided as a control pulse. When the storage unit is used, this pulse is used as a strobe pulse to effect the storage of signals on leads ① through ⑤ as will be described below in connection with the storage unit shown in FIGURES 15–19. When the storage unit is not used, the pulse on lead 82 is discarded, and instead, a slightly delayed pulse appearing on lead 90 is used in the control unit to be next described.

CONTROLLER UNIT

Figure 10C:
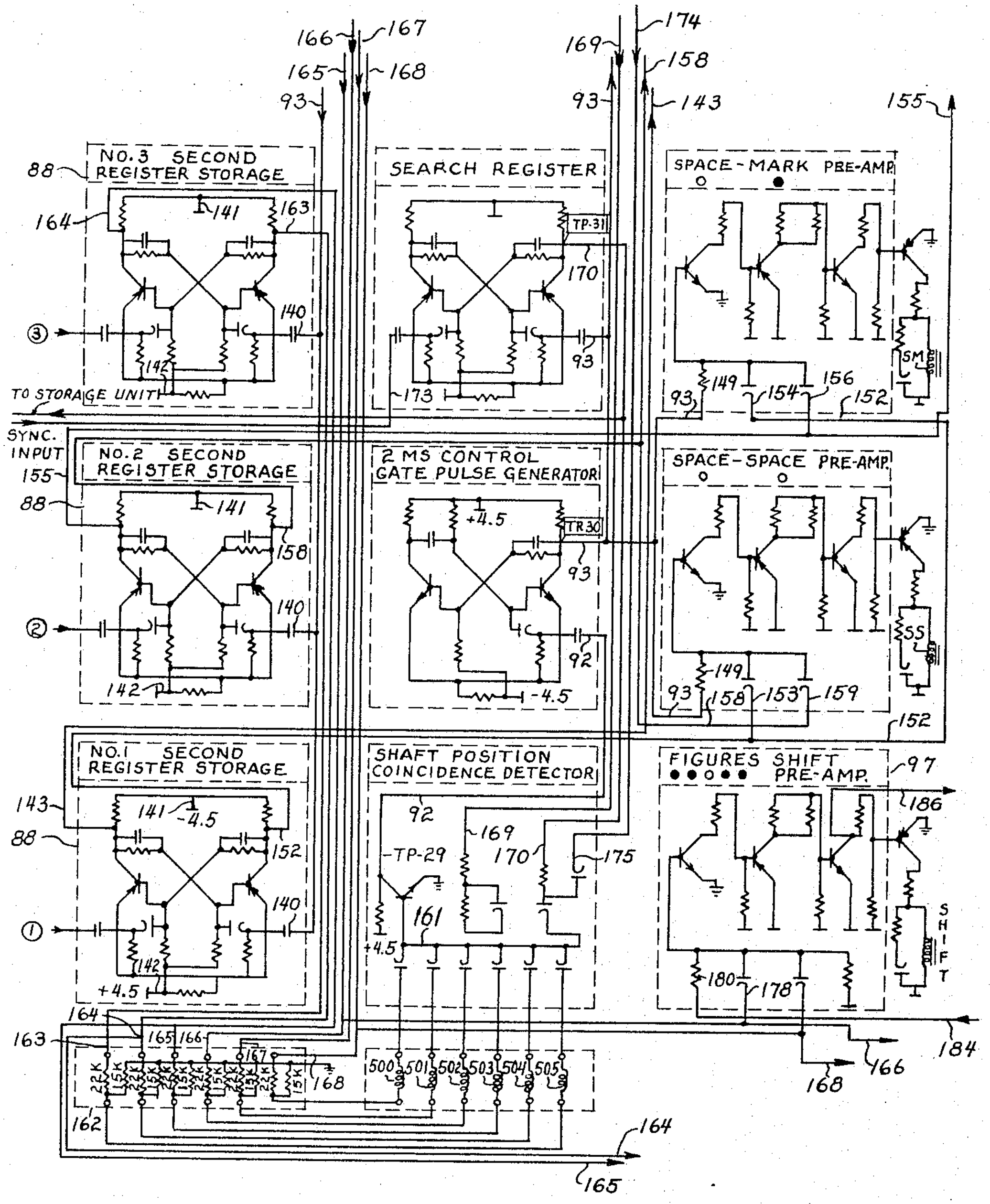

The controller unit circuit diagram is shown in FIGURES 10C, D, E and F. Referring first to that portion of the controller unit shown in FIGURES 10C and 10D, the five second register storage stages are shown along the left-hand margin of the two sheets containing those figures and the signal input terminal to each of the five stages is marked with the digit ① through ⑤ which corresponds to the code element which each stage receives. Each of the second register storage stages 88 comprises a bi-stable circuit of the Eccles-Jordan type so that once an input signal is received, the circuit maintains that status until a reset signal is applied on lead 93 through capacitors 140. In this particular circuit, a space is represented by no signal and a mark represented by a signal over input leads ① through ⑤.

Each of the second register storage stages 88 is supplied with a negative 4.5 volts on terminal 141 and a positive 4.5 volts at terminal 142. The reset pulse on lead 93 through capacitors 140 cause the right-hand side of the circuit to conduct while current conduction through the left-hand side is blocked. If any code element in the Baudot Code is a mark, a signal is received on the corresponding input lead marked ① through ⑤ to transfer the circuit in the particular second register storage stage 88 to its alternate condition whereby the left-hand side becomes conducting and the right-hand side is cut off. A signal indicative of a space in the Baudot Code comprises no signal whatsoever. Thus, if no signal is received, the second register storage stages 88 are in a space indicating condition which, as is apparent from FIGURES 4 and 6, is used to indicate a blank.

Figure 10D:
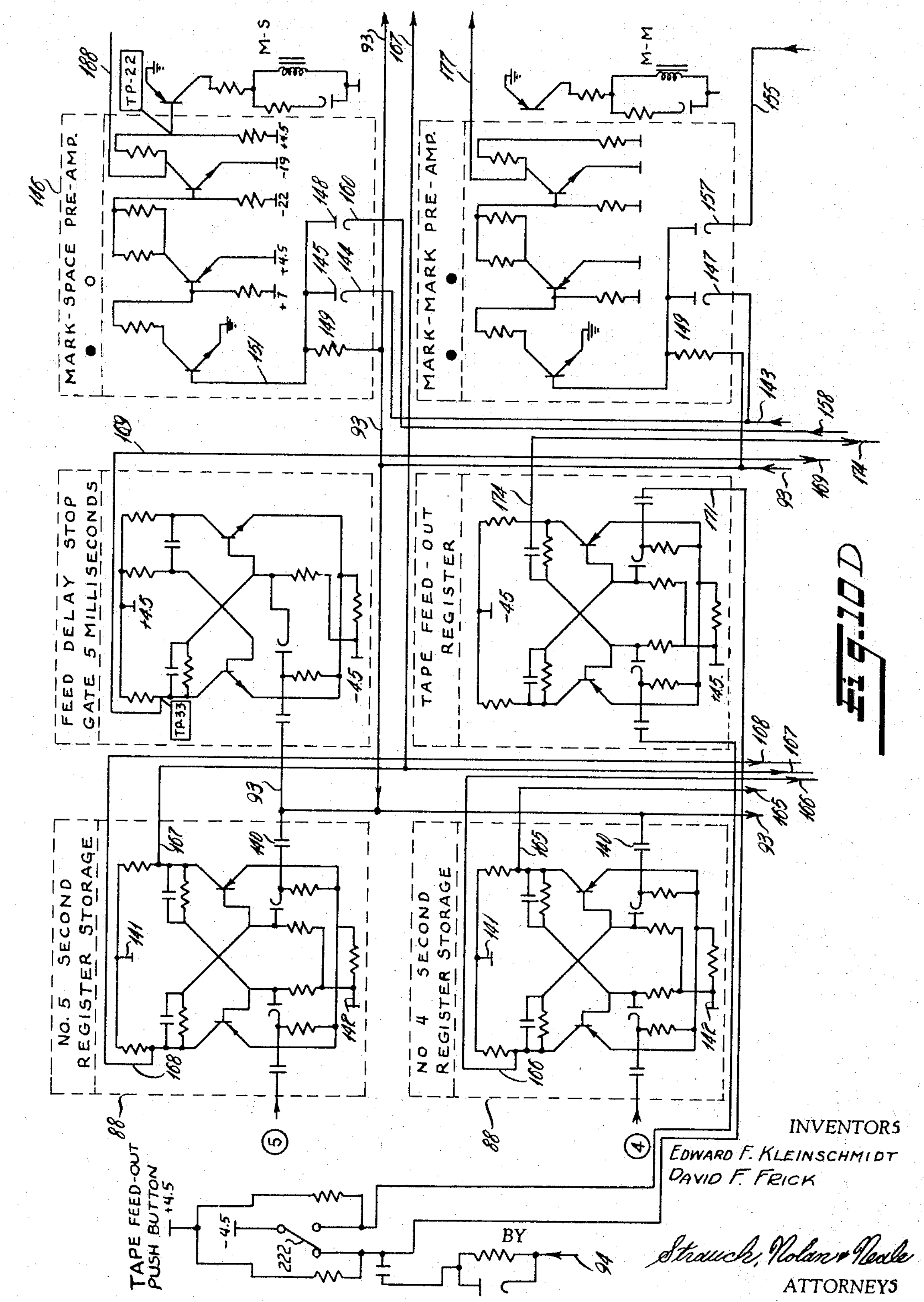

Referring now to FIGURE 10C, if the signal in the No. 1 second register storage stage 88 is a space, the left-hand side will be cut off thereby providing a negative voltage of about 3 volts on lead 143 to the cathode 144 of diode 145 of the mark-space pre-amp stage 146 as shown in the upper right-hand portion of FIGURE 10D, and to cathode 147 of the mark-mark pre-amp. Diode 145 together with diode 148 and resistor 149 across which a positive pulse is applied through lead 93 from the 2 millisecond control gate pulse generator shown in the middle of FIGURE 10C comprise an "and" gate for the mark-space pre-amp. Analogous "and" circuits are provided for each of the three addition selector magnet pre-amps, viz, mark-mark (FIGURE 10D), space-mark and space-space (FIGURE 10C).

A positive pulse is applied through resistor 149 in each of the "and" gates of the above-identified pre-amp stages. This causes the anodes of the two diodes, viz, for example, diodes 145 and 148 in the mark-space pre-amp 146, to go positive and thus apply a positive signal on lead 93 to the mark-space pre-amp, only if the cathodes of diodes 145 and 147 are both at a positive potential. If either cathode is at a negative potential, the anode of that diode and hence conductor 151 cannot rise to a higher positive potential and the pulse is accordingly blocked from being transmitted along lead 151 to the pre-amp.

If a mark pulse appears at input ① of the No. 1 second register storage stage 88, the circuit will transfer to its other stable condition whereby a positive voltage of about 3 volts is applied on lead 143 to the cathode 144 of diode 145 in the mark-space pre-amp circuit 146 and to cathode 147 of the mark-mark pre-amp circuit both in FIGURE 10D.

A second output signal is supplied from the No. 1 second storage register on lead 152 which is applied to cathode 153 of the first diode in the space-space pre-amp, FIGURE 10C, and also to cathode 154 of the first diode in the "and" gate for the space-mark pre-amp shown in the upper right-hand corner of FIGURE 10C. The signal on lead 152 is opposite in polarity to the signal on lead 143. Thus, when a space condition is indicated by the No. 1 second storage register, a positive voltage is applied on lead 152 to each of cathodes 153 and 154 of the space-space pre-amp and space-mark pre-amp respectively. If both of the other inputs are of proper polarity, an output signal from the pre-amp stage will be provided for a period of 2 milliseconds to energize the corresponding selector magnet coil.

The No. 2 second register storage stage operates in identically the same manner as does the No. 1 second register storage stage and is so wired with the selector magnet pre-amps that the positive voltage on lead 155 when a mark signal is present as the No. 2 code element is applied to cathode 156 of the second diode in the upper "and" gate of the space-mark pre-amp shown in the upper right-hand corner of FIGURE 10C and to the cathode 157 of the second diode in the "and" gate of the mark-mark pre-amp in the lower right-hand corner of FIGURE 10D.

When the No. 2 code signal of the incoming Baudot Code is a space, the positive voltage on lead 158 of the No. 2 second register storage stage is applied to the cathode 159 of the second diode in the "and" gate for the space-space pre-amp shown on FIGURE 10C and through lead 158 to cathode 160 of diode 148 of the "and" gate for the mark-space pre-amp 146 shown in FIGURE 10D.

The four magnet coils designated M–S at the output of the mark-space pre-amp and M—M at the output of the mark-mark pre-amp of FIGURE 10D and S–M of the space-mark pre-amp and S—S of the space-space pre-amp of FIGURE 10C are momentarily supplied with a current from their corresponding pre-amp stages for a period of approximately 2 milliseconds to thus energize the one-out-of-four selector magnets which will be effective to cause the desired character to be printed and punched on the paper tape.

As is apparent from FIGURE 2, each of the four selector magnets has associated therewith eight code rod elements. These eight code rod elements are accessible from one end of a wheel which turns at a uniform angular velocity of approximately 3700 r.p.m. and a particular one of the code elements which is selected depends upon the precise moment of energization of whichever of the selector magnet coils S–M, M—M, M–S and S—S that is chosen.

Figure 5:
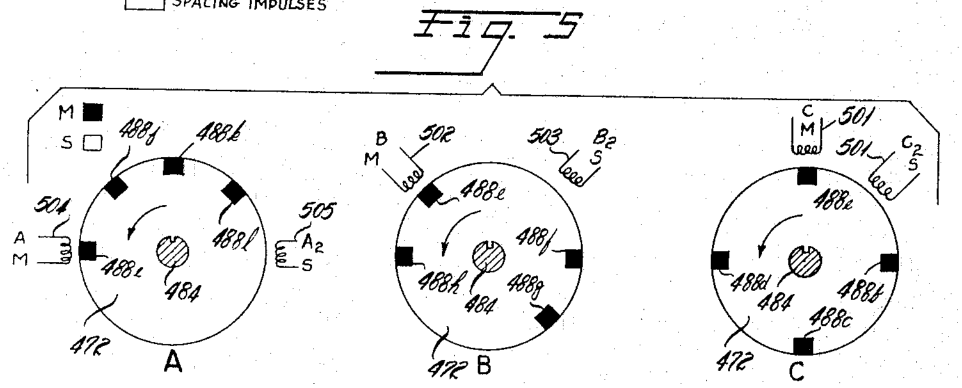
FIGURE 5 is a schematic illustration of the three planar magnetic groups in the coincidence selector by which the cycle of rotation of the mechanical code rod wheel is divided into eight equiangular signal positions with eight different three-unit code signals generated for the respective eight positions.

Referring now to FIGURE 5, a series of pick-up coils 500, 501, 502, 503, 504 and 505 are illustrated in a physical position relative to the permanent magnets 488 *a* through *l*, mounted on wheels which turn synchronously with the code rod wheel shaft 292. The four permanent magnets 488 on each of the three sections of the wheel are so related relative to the two fixed pick-up heads that currents are generated through the coils which correspond to the No. 3, No. 4 and No. 5 code impulses of the Baudot Code so as to provide a gating signal which will energize one of the code rod selection magnets S–M, M—M, M–S and S—S of FIGURE 2 at precisely the correct moment.

In the position illustrated in FIGURE 5, an output signal will appear in the mark coil 504 in the "A" plane since a permanent magnet 488 is immediately adjacent pick-up coil 504 but no signal will appear from the space pick-up coil 505; similarly, in the "B" plane, an output signal will appear from mark coil 502 but no signal will appear from space coil 503; and in the "C" plane, an output signal will appear from the mark coil 500 but none from the space coil 501. As the pick-up coils appear in the "A," "B" and "C" planes which correspond to the last three code impulses of Baudot Code, it is possible at this point in time to select the code bar element corresponding to: "letters" if the first two Baudot Code impulses are mark-mark; "X" if the first two code elements are mark-space; "V" if the first two code elements are space-mark; and "M" if the first two code elements are space-space.

As the code wheel shaft 292 rotates one-eighth of a revolution counterclockwise, an output signal will be obtained from the wheel in the "A" plane from mark coil 504 and none from the space coil 505. In the "B" plane, no signal will appear from the mark coil 502 at this position, but an output signal will appear from the space coil 503. In the "C" plane, no output signal will appear from the mark coil 500, but an output signal will appear from the space coil 501. Thus, at a position 45 degrees counterclockwise from that illustrated in FIGURE 5, an output signal will appear from the mark coil 504 and from the space coils 503 and 501 to indicate the No. 2 code position of the code wheel which makes available the code rods for the letters U, S, I and "space," depending upon whether the first two code elements are mark-mark, mark-space, space-mark or space-space, respectively.

As is apparent from the chart in FIGURE 6, the mark coil 504 in the "A" plane will provide an output signal at each of the first four positions and then the space coil 505 in the same plane provides an output signal in the last four positions as the code wheel shaft makes one revolution. In the "B" plane, the mark coil 502 provides an output signal at the first, fourth, fifth and eighth positions whereas the space coil 503 provides an output signal at each of the second, third, sixth and seventh positions. In the "C" plane, the mark coil 500 provides output signals at the odd numbered positions whereas the space coil 501 provides output signals at the even numbered positions. Thus an output signal is provided from one or the other of the mark or space coils in each of the "A," "B" and "C" planes at each of the eight positions of the code rods around the code wheel shaft to thus provide three output signals indicative of the code wheel position at each of the 45° points on the code wheel.

The several pick-up coils 500–505 are shown at the bottom center in FIGURE 10C and numbered with the corresponding reference numerals. One terminal of each of the pick-up coils 500–505 is connected to a separate anode of a series of six diodes having their cathodes connected in parallel to thus form an "and" gate. In this gate circuit, the common cathode conductor 161 is held at a positive potential of approximately 0.2 volt so long as any one of the anodes of the diodes is connected through pick-up coils 500–505 to a positive voltage at the lower terminals of the resistor network 162. The upper terminal of each of the 15K resistors is connected to ground. The upper terminal of each of the 22K resistors is connected to one or the other of the output terminals from each of the No. 3, No. 4 and No. 5 second register storage stages 88. When the No. 3 code signal is a space, a positive voltage of approximately 3 volts appears on lead 163 while a negative potential of about the same magnitude appears on the adjacent lead 164. The corresponding output leads 165 and 166 from the No. 4 second register storage stage shown in FIGURE 10D are connected to the next pair of terminals of resistor bank 162. Output leads 167 and 168 are connected from the No. 5 second register storage stage 88 to the third pair of resistors in the resistor bank 162.

When the input signals to Nos. 3, 4 and 5 second storage stages are all marks, then the left-hand side of each of the second storage register stages 88 for the Nos. 3, 4 and 5 signals is conducting thereby providing a positive output signal of approximately 3 volts on leads 164, 166 and 168 respectively and negative voltage of approximately 3 volts on each of the leads 163, 165 and 167, respectively. The only time that a negative going output pulse can appear on the common cathode conductor 161 is when each of the anodes of the six diodes is made negative since so long as any anode is retained at the slightly positive potential, the voltage drop across that particular diode, being substantially zero in its forward direction, prevents the cathode from dropping to a negative value.

Three of the anodes are always connected to positive voltages in resistor bank 162 irrespective of whether the code signals are a mark or space, and it is necessary that the negative going voltage pulse supplied by each of pick-up coils 500–505 as the result of the rotation of a permanent magnet 488 as shown in FIGURE 5 past the pick-up coils to be present in the particular ones of the anode circuits which are connected to the positive voltage from the Nos. 3, 4 and 5 second register storage stages 88 before a coincidence can be indicated.

Under the assumed example where the positive voltages are supplied on leads 164, 166 and 168 corresponding to a mark signal in each of the No. 3, No. 4 and No. 5 second register storage stages, a coincidence will be indicated when a neutralizing voltage of negative polarity is provided by the corresponding pick-up coils 500, 502 and 504. This condition exists only at the position of the code rod selection shaft illustrated in FIGURE 5 where a permanent magnet 488 is in operative relation with each of the mark coils: 500 in the "C" plane, 502 in the "B" plane, and 504 in the "A" plane. At this point in time, a negative going coincidence indicating pulse is provided on conductor 161. A positive going pulse then appears on lead 92 as illustrated in the timing chart of FIGURE 13 and is applied to the input of the 2 millisecond control gate pulse generator. The output signal on lead 93 at test point (TP) 30 shown also in FIGURE 13 is applied to resistors 149 in the "and" gates for each of the mark-space, mark-mark, space-mark and space-space pre-amp stages to thus trigger the one of the four stages which has a positive voltage applied to the cathodes of each of the diodes in the associated "and" gate into a conductive condition to thereby energize the corresponding selection magnet.

The leading edge of the output signal from the 2 millisecond control gate generator on lead 93 is applied as an input signal to the feed delay stop gate which is shown in FIGURE 10D at the upper center position. The output signal from left stage on lead 169 is applied as an inhibitor signal to the common cathode conductor 161. In its "no signal" condition, the voltage on lead 169 is approximately a negative 3 volts while the signal during the 5 millisecond gating period is a positive 3 volts. This positive voltage signal is sufficient to prevent conductor 161 from going negative even though a coincidence is registered by all of the anodes of the diodes connected to conductor 161.

The 5 millisecond delay provided by signal on lead 169 is necessary to assure that the mechanical functions of the reperforator and printing unit are completed before the next coincidence position can be detected. During the interim of this 5 millisecond delay, each of the second register storage stages 88 are triggered back to their "no signal" condition by the trailing edge of the 2 millisecond pulse from the 2 millisecond control gate pulse generator output lead 93.

The signal on lead 93 is also applied to the search register stage shown at the upper center of FIGURE 10C. The search register stage is a bi-stable circuit having a voltage output signal at test point (TP) 31 which is shown in FIGURE 13. The positive voltage level of the signal at TP 31 on lead 170 is a positive 3 volts whereas the negative going portion of the signal is a negative 3 volts. The output signal on lead 170 is applied to the common cathode conductor 161 of the "and" gate in the shaft position coincidence detector circuit and is effective to prevent a coincidence detection signal from being indicated when the search register has been triggered by the signal on lead 93 which causes the positive voltage to appear on lead 170.

The search register bi-stable circuit is triggered to its "read-out" condition by the sync input signal on lead 173 which is provided from the receiver-selector when no storage unit is present and from the storage unit when it is used. In FIGURE 10A, the read-out signal on lead 90 is delayed by 50 to 100 microseconds from the read-out signal on lead 82 which causes the signals stored in the first register storage elements 78 to be read out and applied to the second register storage circuits 88 shown in FIGURES 10C and 10D. The sync input signal from lead 90 of FIGURE 10A is then applied to lead 173 shown in FIGURE 10C to thereby trigger the search register to cause the voltage on lead 170 connected to the common cathode conductor 161 to be negative. Since the sync pulse on lead 173 to the search register trails the code element signals which are applied to the second register storage stages, the controller unit is ready to "read-out" by the time the search register triggers to unblock the shaft position coincidence detector circuit.

Summarizing then, an output signal from the shaft position coincidence detector circuit cannot be obtained within the first five milliseconds after a character is indicated and the code rod selected because of the inhibit voltage on lead 169 provided from the feed delay stop gate shown in FIGURE 10D. After this 5 millisecond delay, a coincidence signal still cannot be indicated until the search register is triggered to remove the positive voltage from lead 170. Since the sync input signal on lead 173 to the search register is delayed slightly behind the incoming code signals to the second register storage circuits 88, the search register does not open until after the second register storage stages have received the code elements of the next code character to be processed by the reperforator unit. As soon as the search register has triggered and the positive voltage on lead 170 is removed, the shaft position coincidence detector is ready to provide an output signal as quickly as the code wheel shaft rotates to a position so that the output signals from the pick-up magnets 500–505 register a coincidence with the No. 3, No. 4 and No. 5 code elements of the coded signal then in the second register storage stages 88.

As is apparent from FIGURE 13, at the time period of 2 milliseconds after a coincidence has been indicated by the shaft position coincidence detector, the signal which has been transferred to the mechanical portion of the reperforator unit through the selection of the corresponding code rod element is then discarded from the second register storage stages 88 and any time after the end of this 2 millisecond delay, the second register storage stages 88 are ready to receive the next incoming coded signal.

When the storage unit is used and when the incoming signal comprises two or more characters, which because of their physical position on the code wheel, cannot be selected within the time interval between transmission of the successive code elements so that there is a backlog of characters in the storage unit waiting to be processed by the machine, the next character can be pulled out of the storage unit and applied to the second register storage stages 88 immediately after the search register signal on lead 170 becomes positive. This signal is applied to the storage unit as indicated in FIGURE 10C to thus permit the storage unit to send the next character to be recorded to second register storage stages 88 in the controller unit of FIGURE 10C. Accompanying such signals is a signal on the sync input lead 171 to the search register to thereby trigger the search register to its operating condition again which conceivably could occur before the end of the 5 millisecond feed relay period expires. In that event, the positive voltage on lead 170 to the common cathode conductor 161 of the shaft position coincidence detector will be removed before the positive voltage on lead 169 from the 5 millisecond gate is removed to that immediately upon completion of the 5 millisecond period, the shaft position coincidence detector circuit will be capable of registering the next coincidence, which with a most favorable sequence of letters could be after ⅜ of a revolution of the code wheel shaft 292.

With a favorable sequence of letters, it is possible to process characters through the reperforator and printing unit of the present invention at the rate of over 2 for each rotation of the code wheel shaft 292. This corresponds to a rate of about 160 characters per second.

In FIGURE 20, a timing chart is shown wherein the top row of numbers represents milliseconds during the operation of the machine at its top design speed of 75 operations per second. This chart shows that with the best sequence of characters, the rate of selection is such that every twelfth code bar can be selected which corresponds to a selection of a new character about once every six milliseconds. However, with the worst sequence of characters, the time period between two successive characters may be more than twenty-one milliseconds.

To prevent the loss of any transmitted characters, it is necessary to operate at a rate slower than 50 operations per second, which would correspond to 20 milliseconds per operation. To increase the speed of operation of the present invention to 75 operations per second, which it is capable of doing successfully, a storage unit, which will be described below and which is of the type that holds the code signals representing the characters received in their proper sequence, is provided to make the code signals available to the second register storage stages 88 at whatever rate the reperforator and printing unit can process the information.

From the foregoing, it is apparent that the output signals from the storage unit may be called for with time intervals between the successive signals varying from 6 milliseconds to 21.5 milliseconds.

At rates of signal transmission less than about 48 operations per second where the storage unit is not used, a coincidence signal cannot be provided from the shaft position coincidence detector so long as the search register stage of FIGURE 10C indicates that there is no signal stored in the second register storage stages 88. Thus the controller unit stands ready to receive signals at any frequency less than the maximum range for which it is designed and thus receive hand typed messages where there may be delays of up to several seconds between successive characters.

AUXILIARY FUNCTIONS

*Manual tape feed-out*

Tape feed-out is effected through a push button 222 shown in FIGURE 1 which is manually operable to advance the tape for the purpose of removing the tape from the machine after a signal has been received. In FIGURE 10D, the tape feed-out button operates switch contact member 222 to transfer it to its alternate position when it is manually depressed. This applies a negative potential of 4.5 volts on lead 171 to trigger the tape feed-out register to its alternate conduction condition.

The output signal on lead 174 from the tape feed-out register varies from a positive 3 volts to a negative 3 volts on the depression of switch contact 222. When a positive 3 volts appears on lead 174, this voltage is applied to the cathode 175 of the diode 176 having its anode connected to lead 170 on which lead the output signal from the search register appears. When the output signal on cathode 175 is a positive voltage, it does not interfere with the previously described operation of the circuit. However, when the output voltage on lead 175 is a negative 3 volts, this has the effect of removing from lead 170 the positive 3 volts supplied as a blanking or inhibit signal which prevented the shaft position coincidence detector circuit from registering a coincidence during the time intervals when there is no code signal stored in the second register storage stages 88. The effect of the negative 3 volts on cathode 175 is to cancel the inhibit voltage on lead 170 and thus permit the shaft position coincidence detector to register coincidence in its usual manner, assuming the inhibit signal on lead 169 from the 5 millisecond feed delay stop gate is not present.

Since no signal is stored in any of the second register storage stages 88, each is in a space condition and the space-space selector magnet will be energized at the time when the cycle of rotation corresponding to the No. 6 position of the code wheel, which corresponds to all spaces as shown in the chart of FIGURE 6. This will be effective to punch a blank and will advance the tape one position for each revolution of rotation of the code wheel craft 292.

If an incoming signal appears on the input line at the time when the tape feed-out button is depressed, at the time the signal is being stored in the first register storage stages 78 of the receiver-selector unit shown in FIGURE 10A, output signal from the 35 microsecond delay multivibrator on lead 138 causes the 5 millisecond delay circuit to operate and the output signal on lead 94 of that circuit which comprises a negative going pulse is applied to lead 94 and through the resistor capacitor shown in the upper left-hand corner of FIGURE 10D to lead 171 to thereby immediately trigger the tape feed-out register back to its normal condition. This removes the voltage from lead 175 so that the positive voltage on lead 170 from the search register will stop further output signals from common cathode conductor 161. The shaft position coincidence detector will then be incapable of indicating a further coincidence until after the input signal is applied to the second register storage stages 88 and the search register is transferred so that the positive inhibit voltage on lead 170 is again replaced by the negative voltage permitting the coincidence pulse on conductor 161 to be produced.

By the foregoing combination of circuit elements, the very first incoming signal which is received during a time interval when the manual tape feed-out button is depressed will be processed by the tape perforator unit of the present invention. In the prior machines of this type, the first signal has been used to disenable the manual tape-feed button control and hence was lost and not printed or punched in the tape.

*Letters unshift and figures shift*

Figure 10E:
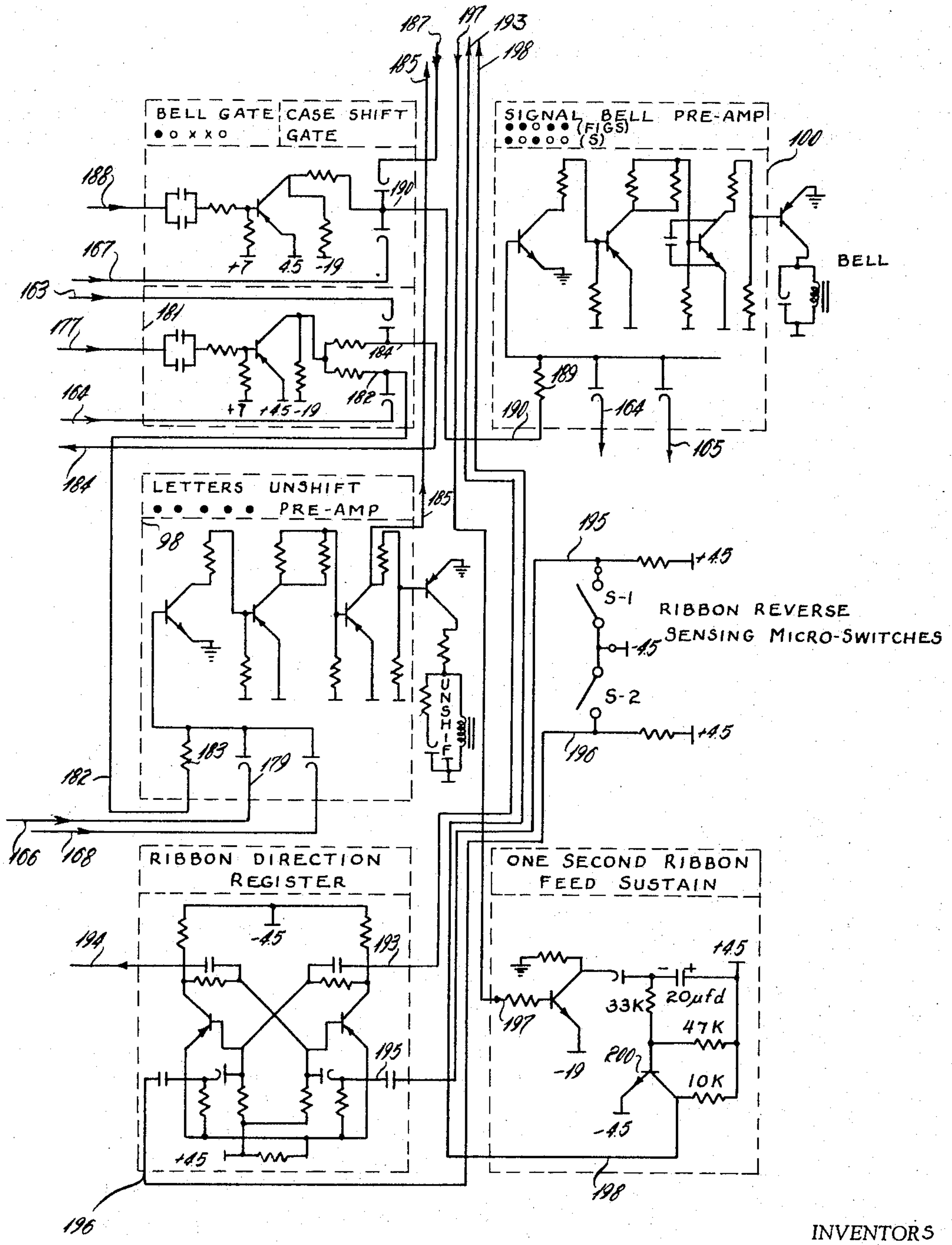

The "figures shift" pre-amp stage 97 is shown at the lower right-hand corner of FIGURE 10C and the "letters unshift" pre-amp 98 is shown in the center of the left-hand side of FIGURE 10E. As is apparent from the code element chart in FIGURE 6, the two code signals are identical except for the third code element. In the fifth position of the code wheel chart of FIGURE 6, the "figures" code consists of mark-mark-space-mark-mark whereas the code element for "letters" in the first position comprises five marks. With the No. 4 and No. 5 code elements being the same, the positive voltage signal present on lead 166 from the No. 4 second register storage stage 88 and the voltage signal present on lead 168 from the No. 5 second storage stage 88 is applied as the input signal to the "and" gate diodes 178 of the figures "shift" pre-amp stage and diodes 179 of the "and" gate in the input to the letters "unshift" pre-amp stage 98 in FIGURE 10E.

As is apparent from FIGURE 6, the No. 1 and No. 2 code elements for both letters and figures are mark-mark. Thus a signal is taken from the mark-mark pre-amp stage shown in FIGURE 10D on lead 177 and applied as an input signal to the case shift gate 181 on FIGURE 10E. The other two inputs to case shift gate 181 are applied on leads 163 and 164 from the No. 3 second storage register stage 88 shown in FIGURE 10C, the positive pulse being present on lead 164 to thereby provide an output signal on lead 182 when the No. 3 code element is a mark which is applied resistor 183 to thus energize the "unshift" current coil of the magnet associated with the printing wheel to thus move the printing wheel to its "letters" printing position.

In the event that the output signal on lead 163 from the No. 3 second register storage stage 88 in FIGURE 10C is positive corresponding to a No. 3 code element that is a space, then the positive output signal from the case shift gate 181 in FIGURE 10E will be on lead 184 which is applied as the input signal to the figures "shift" magnet to be energized to shift the printing wheel to its "figures" position.

Figure 10F:
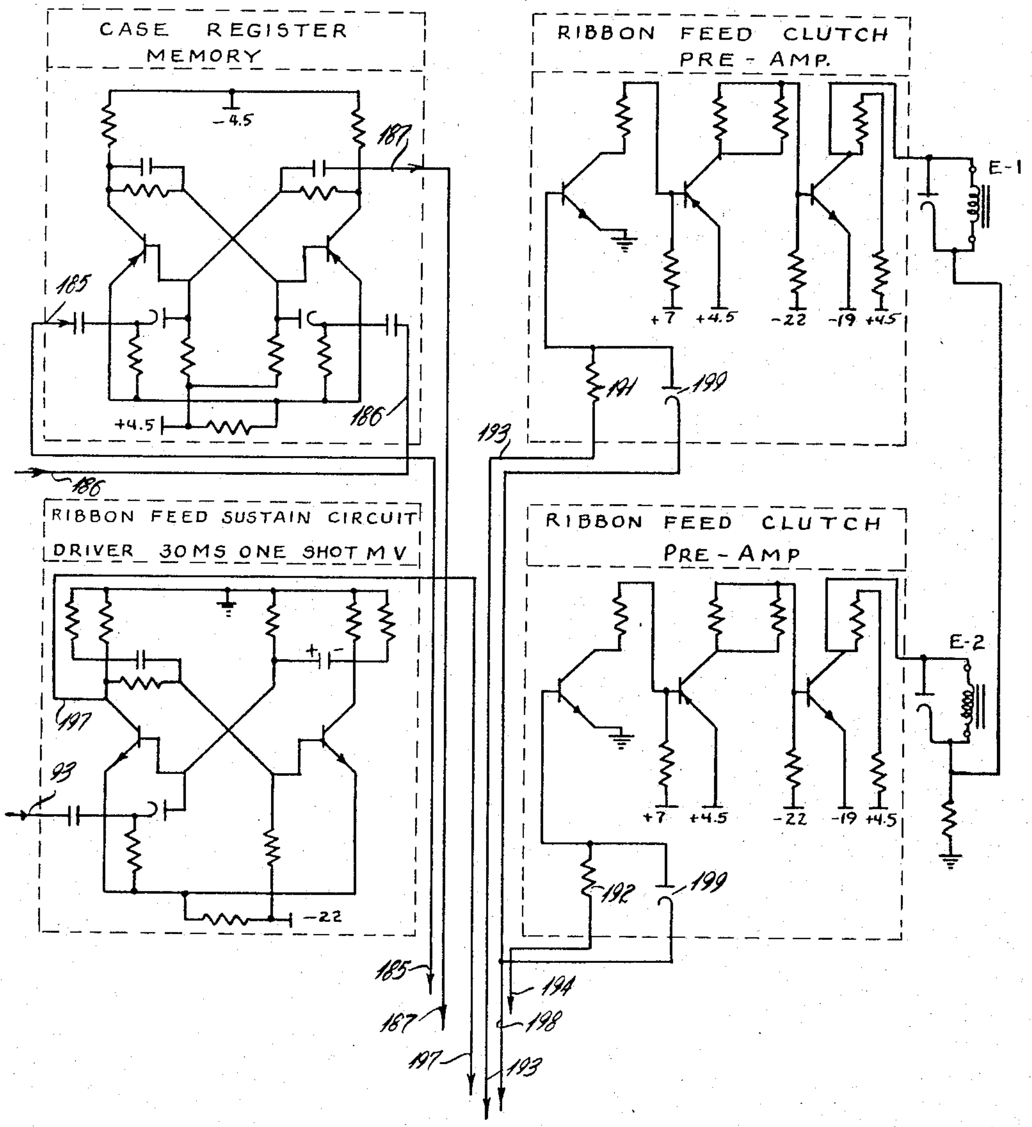

As will be explained below, the printing wheel is mounted on a shaft which is cam driven to one or the other of the two printing positions and stays in whichever position it is last placed until again shifted. At the upper left-hand corner of FIGURE 10F is a case register memory stage which comprises a bi-stable circuit having an input signal on lead 185 which comes from the letters "unshift" pre-amp stage 98 in FIGURE 10E and a second input lead 186 which extends from the correspondingly numbered output lead from the figures "shift" pre-amp stage in FIGURE 10C. The output signal on lead 187 is accordingly a minus 3 volts when the letters "unshift" magnet was last to be energized and a plus 3 volts when the figures "shift" magnet was last to be energized.

*Signal bell*

The reperforator and printing unit of the present invention is provided with means for ringing a bell when the figures "shift" signal was received subsequent to a letters "unshift" signal and when the signal corresponding to S is received. The bell pre-amp stage is shown in the upper right-hand corner of FIGURE 10E. On lead 164 of the "and" gate to the signal bell pre-amp stage 100 shown in FIGURE 10E, a positive input signal is applied from lead 164 from the No. 3 second storage register stage 88 in FIGURE 10C when the third code element is a mark signal. A positive input signal is applied on lead 165 to the other diode of the "and" gate for signal bell pre-amp 100 from the output lead of the No. 4 second register storage stage 88 in FIGURE 10C when the No. 4 code element is a space.

The input signal to resistor 189 of the "and" gate in the input of the signal bell pre-amp 100 is on lead 190 which comes from the output of the bell gate shown in the upper left-hand corner of FIGURE 10E.

The input signal to the bell gate on lead 188 is supplied from the output lead 188 of the mark-space pre-amp stage 146 in FIGURE 10D. The signal input for the No. 5 code element is on lead 167 from the output of the No. 5 second register storage stage 88 in FIGURE 10D. In order that an output signal will appear on lead 190 from the bell gate, there must also be the positive input signal on lead 187 from the output of the case register memory stage shown in FIGURE 10F which indicates that the figures "shift" has been energized subsequent to the energization of the letters "unshift" magnet. The input signal on lead 190 to the signal bell pre-amp stage thus occurs only when the figures "shift" has occurred subsequent to the last letters "unshift" signal and the letter S is transmitted. Only under those circumstances can the bell magnet coil be energized.

*Ribbon feed drive*

One of the ribbon feed clutch coils E–1 and E–2 shown on the right-hand side of FIGURE 10F is normally continuously energized during operation of the machine to thereby provide for continuous drive of the ribbon in one or the other direction. An input control signal is supplied across resistors 191 or 192 depending upon the direction of the ribbon feed. The signals applied to resistors 191 and 192 come from leads 193 and 194, respectively, which are connected as the output leads from the ribbon direction register shown at the lower left-hand corner of FIGURE 10E. The ribbon direction register is a bi-stable circuit substantially identical to the bi-stable circuits used in the second register storage stages 88 and provides a positive voltage of approximately 3 volts on one of the leads and a negative voltage of approximately 3 volts on the other lead. The circuit receiving the negative voltage is cut off while the circuit receiving the positive voltage is caused to energize the selected associated ribbon feed clutch magnet E–1 or E–2.

The input signals to the ribbon direction register are applied over leads 195 and 196 to a normally positive voltage terminal. Two ribbon reverse sensing micro-switches S–1 and S–2 are provided, which momentarily close when one or the other of the ribbon spools is substantially empty to thereby reverse the direction of ribbon feed by means of the application of a negative potential applied through the closed micro-switch from a negative voltage terminal which is connected to one terminal of each of the two switches S–1 and S–2. Once a ribbon direction is established, the ribbon continues to feed in that direction until a reverse sensing micro-switch is closed to reverse the ribbon feed direction.

To stop the ribbon feed during long periods of no signal transmission of reception by the reperforator and printer unit of the present invention, a circuit is provided which prevents either of the ribbon feed clutch magnet coils E–1 or E–2 from being energized after a time interval of approximately 1 second has lapsed subsequent to the receiving of a signal from the incoming line. This circuit comprises a ribbon feed sustain circuit driver shown at the lower left-hand corner of FIGURE 10F which receives an input signal on lead 93 which contains the two millisecond control pulse provided at each time a coincidence is registered on common cathode conductor 161. The ribbon feed sustain circuit driver is a single shot multivibrator having an output pulse of approximately 30 milliseconds in duration which appears on lead 197. This pulse is applied as the input signal to the 1 second ribbon feed sustain circuit shown in the lower right-hand corner of FIGURE 10E. This circuit provides an output signal on lead 198 of about plus 4 volts which is applied to the cathodes of diodes 199 in the input circuits to each of the ribbon feed clutch pre-amp stages.

Each time a pulse is received over input lead 197 to the one second ribbon feed sustain circuit, the 20 microfarad condenser is charged sufficiently so that it will require a time period of about 1 second before the voltage level decays to the point where the transistor 200 conducts whereby the output voltage on lead 198 becomes approximately a negative 4 volts. When a negative voltage is applied to the cathodes of diodes 199 in the ribbon feed clutch pre-amp stages, both pre-amp stages are cut off and neither ribbon feed clutch coil E–1 or E–2 can be energized.

As soon as the next incoming signal is received by the controller unit and a coincidence is indicated, the output signal from the ribbon feed sustain circuit driver on lead 197 recharges the condenser in the 1 second ribbon feed sustain circuit to thereby provide a positive voltage on lead 198 and unblock the ribbon feed clutch pre-amp stages. One or the other of the ribbon feed clutch pre-amp stages is then conductive depending upon the output signal provided by the ribbon direction register on leads 193 and 194.

STORAGE UNIT

The storage unit is illustrated in FIGURES 14–19. As the sequence of the characters received over the incoming transmission line is random and as the rate that characters can be processed by the reperforator and printing unit of the present invention depends upon the sequence of the characters, the use of the storage unit of the type herein described makes possible the operation of the equipment at an average speed of nearly 50% greater than the slowest speed which would have to be used in the event that no storage unit is provided to prevent the loss of certain characters in the transmitted message.

It is possible that certain sequences of letters may be processed by the mechanical part of the apparatus at the rate of approximately 160 operations per second, that is one selection for every ⅜ revolution of the code rod selection wheel. However, with certain adverse sequences, the code rod selection wheel may be searched for 1¼ revolutions, as is apparent from FIGURE 20. The extra ¼ revolution is necessary since the first twelve characters following selection may not be used because the mechanical functioning of the apparatus requires a minimum of 4 or 5 milliseconds to complete an operation. Therefore, under the worst conditions a printing rate of about 50 operations per second is maximum.

A mathematical determination of the probability of error has shown that a storage capacity of only 20 characters is adequate to realize a mean selection rate in excess of 75 operations per second. Therefore, 20 signal storage channels are shown in FIGURE 14, each having a storage capacity for 6-bit characters.

The 5 input signal elements plus the sync pulse are supplied to the storage unit in parallel and processed to the storage unit simultaneously as evident from FIGURE 14.

An input distributor is provided for selectively opening the various signal storage channels 1 through 20 in a sequential manner. A gating circuit is provided so that when the beam switching tube opens a particular channel, the 6 input pulses are applied to this storage channel and the distributor is then advanced to the next successive channel. The input distributor advances one position for each character received and at the rate of the incoming signals. The control signal on the sixth wire which serves as a sync pulse and causes the input distributor to advance immediately after its acompanying 5 unit signal is sent to the signal storage channel.

In the particular embodiment described, a beam switching tube identical to that shown in FIGURE 10B has been used as the input distributor. As this tube has only 10 target electrodes and as 20 signal storage channels are required, the various signal storage channels have been grouped in pairs and a decade selector gate circuit provided to select alternately all the odd-numbered and then all the even-numbered signal storage channels. Upon reaching the No. 7 terminal of the beam switching tube, the decade selector is triggered to provide a signal which then transfers the operation from odd to even or from even to odd. The beam switching tube, however, could advantageously be replaced by other types of known distributors employing thyratrons or vacuum tube or solid states trigger circuits to eliminate the use of the decade selector gating stage.

The output signal from the storage unit in FIGURE 14 is applied as the input signal to the second register storage stages 88 in FIGURES 10C and 10D. The storage unit must be of the first-in, first-out type since it is essential that the signals be supplied from the storage unit in the same sequence or order in which they are received. Therefore, the output distributor, which is totally independent of the input distributor, must search the various storage channels for stored signals in the same order in which the input distributor places them in the storage unit.

When the output distributor finds a storage channel with a signal stored, the output distributor serves to discharge or read-out all six of the individual storage signal elements simultaneously. Once a signal is found by the read-out distributor, a blanking pulse is provided from the search register to prevent the distributor from advancing to the next storage channel until after the code rod is selected.

The output distributor is operated at a relatively high frequency, for example at a frequency of about 1 kilocycle, so that once it catches up with the input distributor, it can pass the input distributor position and rapidly advance through each of the other 20 storage channels to again return to the particular storage channel where the next signal code elements have been stored. Thus, if the input signals were coming in at a high speed, they will be stored in channels 1, 3, 5 . . . As soon as the unit is ready to process the next character, the output distributor will stop at the storage channels 1, 3, 5 . . . in the same sequence and will be advanced at a rate exactly equal to the maximum speed at which the mechanical apparatus can process the characters. The output distributor only becomes free-running when it has completely caught up with the input signals.

Suitable blocking pulses are provided during the time period required to place a signal in one of the storage channels which prevents the output distributor from removing a signal from any storage channel. Also, a similar blocking signal is provided each time the output distributor advances to allow the circuits to reach a stable or quiescent state before attempting to read-out a stored signal.

Referring now to FIGURE 15, the input distributor in the upper left-hand corner and the output distributor in the upper right-hand corner are each illustrated as having 20 switching positions for purposes of simplification of this description. Each storage channel is illustrated in a vertical column and comprises a control stage A1–A20 and each channel 6 storage stages $B^1$, $B^2$, $B^3$, $B^4$, $B^5$ and $B^6$ numbered 1–20 for the various channels. The second storage channel is similarly designated and as each of the 20 storage channels are identical, only 5 are diagrammatically illustrated in this figure.

The No. 1 code element or bit of an input signal is applied to the first code element storage stage of the selected storage channel, i.e., the storage stage of that channel having the superscript 1. Each of the remaining code elements 2–5 of that signal is applied in parallel with code element 1 to the corresponding code element storage stages in the same channel having the correspondingly numbered superscripts. The sync signal on lead 6, which is always a negative pulse, is applied to the storage element of that same storage channel having the superscript 6.

When a signal is supplied to the storage unit, the input distributor is in a condition providing an input gating signal to the next open storage channel. In the embodiment illustrated in FIGURE 15, the distributor is shown in a position whereby the No. 3 storage channel is open and no input signal can be provided to the remaining 19 storage channels. Thus, the input signal applied through the leads marked 1 through 6 is stored in the No. 3 channel and the input distributor is then advanced to its next position corresponding to the No. 5 channel.

When the output distributor advances to the No. 3 channel, a signal is provided to the control circuit represented by the block $A_3$ which then produces a read-out signal that is provided simultaneously to each of the storage stages in the third signal storage channel to thus provide an output signal on leads 1 through 6 near the center of FIGURE 15 and which are inscribed in small squares forming a block. These output signals are then inverted and supplied to the second register storage stages 88 in the controller unit of FIGURES 10C and 10D.

A blocking signal is supplied to the output distributor to prevent it from advancing to the next storage stage until after the signal from the third storage channel has been processed by the mechanical unit. This blocking pulse is supplied from the search register of the controller unit and when the search register has been restored to its non-operating condition by the trailing edge of the 2 millisecond pulse which was initiated by the output signal of the shaft position coincidence circuits, the blocking signal is removed from the output distributor of the storage unit so that the distributor moves to the next storage channel, which in the illustrated example will be the No. 5 storage channel. If there is a signal in the No. 5 storage channel, the distributor stops until that signal is processed by the mechanical unit. If there is no signal in the No. 5 storage channel and no further signals are being received by the storage unit, the output distributor will continue to advance at its cyclic rate of approximately 1 kilocycle until the next incoming signal is received.

FIGURE 16 is a block diagram of the logic used in a single channel of the storage unit. The incoming coded signals are provided at the upper input leads 1 through 6 while the output signals are taken from the lower leads marked 1 through 6. The gate pulse from the input distributor is applied on lead 1601 and the read-out or gating pulse from the output distributor for removing signals from the signal storage channel is provided on lead 1602.

In FIGURE 17, the lower circuit B is a detailed circuit of each of the stages "B" shown in FIGURE 15 and of each of the six stages represented by the logical symbols in FIGURE 16. The circuit for providing the read-in and read-out signals on leads 1601 and 1602, respectively, is designated A. All of the 20 signal storage channels are identical.

The incoming signals supplied to the basic storage circuit comprise negative going pulses having a zero signal reference level of about positive 2 volts and a lower voltage level of about a negative 17 volts. These pulses are applied to anode 1702 of diode 1704. On lead 1601, the read-in pulse is a similar negative going pulse having a reference voltage of about ground level and a negative pulse having an amplitude of about a minus 17 volts. When both negative going pulses appear simultaneously, a negative charge is stored on capacitor 1706.

The anode of diode 1708 is connected to read-out pulse line 1602 which is normally supplied with minus 17 volts and there is accordingly no discharge path for the negative voltage stored on capacitor 1706.

When it is desired to read-out the signals stored in the storage unit, a positive voltage pulse is applied on lead 1602 which discharges capacitor 1706 through diode 1708 and provides a positive pulse on output lead 1710 which indicates that the signal code element in that particular stage of the storage unit was a mark. If the code element is a space, there is no input signal on lead ① and accordingly no output signal on lead [1] after the read-out pulse is supplied.

The input signal to the control circuit A from the input distributor is on lead 1712. Diode 1714 serves as a gate to block any input signal when a positive signal is applied to the input terminal on the anode 1716 of diode 1714. Where a 10 position beam position switching tube is used as a ditributor for a 20 signal channel storage unit, the decade selector gate shown in FIGURE 14 is provided to alternately gate open the even numbered signal storage channels and then the odd numbered signal storage channels. A positive impulse is applied to the anode 1716 of diode 1714 to prevent the associated read-in circuit from being triggered by the input pulse on lead 1712 from the input distributor.

A similar read-out pulse is applied to control circuit A on lead 1718 from the read-out distributor. Diode 1720 is provided to block the input signal to the read-out lead at certain time periods during the operation of the storage unit through the application of a positive voltage potential on the input lead 1722. Control circuits which will be described in connection with the circuit shown in FIGURE 19 are provided to supply blanking pulses during the 600 microseconds required for supplying an input signal to a storage channel to thereby prevent the output distributor from scanning into a signal storage channel which is receiving a signal and also for a period of 75 microseconds during the transition of the output distributor between adjacent output terminals.

Referring now to FIGURE 18, the input signals to the storage unit appear on the lines marked ①, ②, ③, ④, ⑤ and sync input. These signals are supplied directly from the correspondingly designated terminals from the first register storage stages shown in FIGURE 10A. The sync signal is that which is used as the read-out signal for the first register storage stages 78 and is supplied to lead 82 from the first register read-out circuit, FIGURE 7.

With continued reference to FIGURE 18, the input signals corresponding to the coded elements in the Baudot Code are applied to the No. 1, No. 2, No. 3 and No. 4 circuits shown in this figure and to the No. 5 read-in circuit shown in FIGURE 19. Each of these read-in circuits comprises a single shot multivibrator providing a negative output pulse of 500 microseconds duration when the corresponding code element is a mark and no output pulse when the corresponding code element is a space. In the overall system, the output signals from the read-in single shot multivibrator stages are applied to correspondingly numbered leads shown in FIGURE 15 as the input signals to the several storage channels.

Referring now to FIGURE 19, the sync input signal from lead 82 of FIGURE 10A is applied to a similar single shot multivibrator providing a negative output pulse of 500 microsecond duration which is applied in each instance as a mark in the No. 6 position in the signal storage channel. The output signal from the sync input stage on lead 1900 is applied as the input signal to the read-in pulse generator stage which comprises a single shot multivibrator having as an output signal on lead 1902 a positive going pulse of 600 microsecond duration. This pulse is applied through lead 1904 to the input beam switching tube driver stage on FIGURE 18. The trailing edge thereof, being a negative going pulse, is effective to trigger the beam switching driver tube. The trailing edge occurs about 100 microseconds subsequent to the trailing edge of the pulses of the several coded signal elements. Thus the input distributor is advanced immediately subsequent to the placement of the coded signal elements in the signal storage channels.

The read-in decade selector stage shown in FIGURE 19 receives an input signal on lead 1906 each time the beam in the beam switching tube passes a particular predesignated target electrode. This causes the decade selector circuit, which is basically a bi-stable circuit, to trigger from one conduction condition to its alternate conduction condition. One of the output leads is connected to the odd numbered signal storage channels and the other output lead is connected to the even numbered signal storage channels. Whichever lead contains the positive going output signal is effective to block each of the signal storage channels to which it is connected, thereby causing the distributor to complete one cycle of operation using the even numbered signal storage channels and on the next cycle of operation to use the odd numbered signal storage channels. This circuit is required only because beam switching tubes which are commercially available have only 10 target electrodes and by the use of such decade selectors, it makes it possible for the distributor for the beam switching tube to serve 20 separate signal storage channels. If other types of electronic distributors are used, such a decade selector would not be required.

The output distributor for the storage unit is driven by the output beam switching tube driver in a conventional manner and similar to that described in connection with FIGURES 10A and 10B. The input signal to the output beam switching tube driver is supplied on lead 1908 from an output terminal on read-out scanning signal generator which in this particular embodiment is a free-running multivibrator operating at a frequency of approximately 1 kilocycle.

The output signal on lead 1908 from the read-out scanning signal generator is also applied as an input signal to a 75 microsecond pulse gate generator which may comprise a single shot multivibrator that provides a positive going output signal pulse having a duration of 75 microseconds. This pulse appears on lead 1910 and is applied as an input signal to the "or" read-out gate shown also in FIGURE 19.

The main input signals to the read-out gate come from the output terminals 1912 and 1914 of the read-out decade selector circuit. This circuit has an input signal on lead 1916 which is derived from the read-out beam switching tube from a predetermined target electrode so that this circuit, which is a bi-stable circuit, is triggered to its alternate conducting condition once each revolution of the beam switching tube. The output signals on leads 1912 and 1914 are alternatively positive or negative depending upon the conduction of the circuit.

Also applied as an input signal to the "or" read-out gate is the positive going output signal of 600 microseconds in duration on lead 1902 from the read-in pulse generator. The output signals from this read-out gate are applied on lead 1920 to the odd signal storage channels and on lead 1922 to the even numbered signal storage channels. This read-out gate circuit is an "or" gate whereby the voltage on the output leads 1920 and 1922 will be positive if a positive input signal is applied on either the input lead 1910 from the 75 microsecond pulse gate generator or on lead 1902 from the read-in pulse generator. Also, the output signal will be a positive voltage level on lead 1920 if the input signal from the read-out decade selector on lead 1914 is positive and the output signal on lead 1922 will be positive if the signal on lead 1912 is positive.

As explained in connection with FIGURE 17, a positive input voltage on the anode of diode 1720 will prevent a read-out signal from occurring even though the read-out distributor may pass the particular storage stage. Therefore, an output signal from the storage unit cannot be obtained for the first 600 microseconds subsequent to the beginning of the signal storing operation or for the 75 microseconds following the advancement of the readout distributor. These delays are necessary to permit the various circuit transients to subside and the circuits to reach a stable condition to assure reliable operation.

The alternate positive voltage conditions provided on leads 1912 and 1914 are used solely in this embodiment to compensate for the fact that the beam switching tube as a distributor has only 10 output stages whereas 20 signal storage channels are used which thereby requires that a decade selector be provided. As pointed out above, this circuit could be dispensed with in the event a 20 stage distributor is used.

The read-out scanner is provided with an input lead 1924 which is connected to the search register in FIGURE 10C. It will be recalled that the search register is a bi-stable circuit which is triggered by the sync pulse accompanying the coded signal, indicating that the coded signal has been supplied to the second register storage stages 88 in FIGURES 10C and 10D. Upon reception of this sync signal, the search register transfers to its alternate condition thereby removing the inhibit voltage on the common cathode conductor 161 to the coincidence detector stage to permit a coincidence to be indicated as soon as the code wheel shaft 484 rotates to the proper position as determined by the particular code rod element to be selected. During the interval of time required for the shaft position coincidence detector circuit to indicate a coincidence and trigger the 2 millisecond gate generator which is effective to transfer the search register back to its no signal condition, a blanking pulse appears on lead 1924 to prevent the read-out scanner in FIGURE 19 from advancing the read-out distributor. When the trailing edge of the 2 millisecond pulse resets each of the second register stages 88 to their signal receiving position, the blanking pulse on lead 1924 to the read-out scanner in FIGURE 19 is cut off to thereby permit the output distributor to advance to the next signal storage stage. Immediately, when the next occupied signal storage stage is found, a read-out cycle occurs.

Referring now to FIGURES 15 and 18, the stored signals appear on leads marked

[1], [2], [3], [4], [5] and [6]

in the center of FIGURE 15 and are applied to correspondingly numbered leads along the top of FIGURE 18 to the inverter read-out stages which invert the positive going pulses provided on the output leads of the storage stages to negative going pulses which are applied to the input of the second register storage stages 88.

The No. 6 signal from this storage unit is the sync signal and this signal is applied to a 100 microsecond sync delay stage which comprises a one shot multivibrator and is shown in the lower left-hand side of FIGURE 18. The input signal is applied to lead 1930; the output signal is on lead 1932 and is applied as the sync signal to the read-out register in FIGURE 10C. By the time the sync signal arrives, the coded signals to the second register storage stages will have been received and have transferred those bi-stable circuits to a conduction condition representative of the particular coded signal being transmitted. The search register is then triggered by the incoming sync signal from the storage unit to thereby open the shaft position detection circuit to enable it to register a coincidence at a point of time when the code rod corresponding to the transmitted signal is in a position to be transferred by the appropriate code rod selection magnet.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with a communication system including means for receiving coded word signal messages: first and second signal storage registers each having separate corresponding signal element channels; a first-in, first-out storage unit connected between output terminals on said first storage register and input terminals on said second storage register and adapted to receive incoming signals at random rates; means supplying input coded word signals to said first storage register; means connected to the output of said second storage register to process said coded word signals at a varying rate dependent upon the sequence of words received; and means responsive to the processing of one coded word signal for retrieving the next coded word signal from said storage unit.

2. The combination as defined in claim 1, wherein said last mentioned means comprises a search register stage for effecting the processing of the signal from the second signal storage register and means for supplying a control signal from said search register to said storage unit for effecting the retrieval of the next coded word signal from said storage unit.

3. In combination with a communication system including means for receiving and further processing coded word signal messages: a storage unit having a plurality of separate signal storage channels each capable of receiving and storing a plural code element word signal; gate means for each storage channel; an input distributor connected to open one of said gates to receive one incoming plural code element word signal and to advance to the next storage channel upon completion of the storage of said one signal to receive incoming coded word signals at a random rate; an output distributor driven independently of the input distributor for searching and enabling removal of coded word signals from said storage channels in the same sequence that the input distributor stores the incoming coded word signals; and system processing means in control connection with said output distributor to control removal of a coded word signal from a storage channel by said output distributor.

4. The combination communication system with a storage unit as defined in claim 3, further having means for stopping operation of said output distributor during each interval of time a new signal is being added to said storage unit.

5. The combination as defined in claim 3 wherein each of said signal storage channels includes a signal storage circuit comprising a storage capacitor, an "and" gate for controlling the charging of said capacitor with a negative voltage, a diode having its cathode connected to the negatively charged side of said capacitor and its anode connected to a control terminal, a blocking capacitor and resistor connected in parallel with said storage capacitor and to said cathode, an output terminal connected between said blocking capacitor and resistor, and means for applying a positive pulse on said control terminal to discharge said storage capacitor.

6. In combination with a coded signal message communication system adapted to receive a sequential input signal: a transformer having a primary and a secondary winding connected between line input terminals and the receiver circuit; a transistor oscillator circuit of the type adapted to be powered solely by the incoming signal connected between said input terminals and the primary winding of said transformer; circuit means including an R-F filter between said input terminals and said oscillator circuit for shielding the output signal of said oscillator from the line input terminals; and rectifier means connected between the secondary winding of said transformer and the input to said receiver circuit.

7. A serial bit to parallel bit signal converter comprising: an electronic distributor; a register including a plurality of electronic signal storage stages equal to the number of code bits in the serial bit signal; a time base generator operating at a frequency corresponding to the reciprocal of the time intervals between adjacent code elements in said serial bit signal; means connecting said time base generator to drive said distributor; means for connecting each of said code bits simultaneously to all of said storage stages as that code bit is received by the convertor; and means connecting the output of the distributor to selectively open each of said storage stages in a sequence to place one code element in each storage stage.

8. The signal converter as defined in claim 7, said means for connecting each of said code bits to all of said storage stages having a normally closed "and" gate having its output connected to the inputs of all of said storage stages and receiving each of said code bits, and a narrow pulse generator driven by said time base generator to provide a short time period when each code bit is present.
a narrow output pulse to open said "and" gate for only 9. In combination with a coded signal message communication system adapted to receive coded sequential bit input word signals: first and second signal storage registers each having separate corresponding signal element channels; means connected to the output of said second storage register to process said coded word signals at a varying rate dependent upon the sequence of words received; means supplying input coded word signals to said first storage register including a transformer having a primary and a secondary winding connected between line input terminals and the first storage register; a transistor oscillator circuit of the type adapted to be powered solely by the incoming signal connected between said line input terminals and the primary winding of said transformer; circuit means including an R-F filter between said input terminals and said oscillator circuit for shielding the output signal of said oscillator from the line input terminals; rectifier means connected between the secondary winding of said transformer and said first storage register; and means connecting the output signals of said first storage register to input terminals of said second storage register.

10. In combination with a coded signal message communication system, an electronic system selector and controller comprising: a sequential-to-simultaneous signal converter comprising: an electronic distributor; a first storage register; means supplying input coded word signals to said distributor; said first storage register including a plurality of electronic signal storage stages equal to the number of code elements in the sequential signal; a time base generator operating at a frequency corresponding to the reciprocal of the time intervals between adjacent code elements in said sequential signal; means connecting said time base generator to drive said distributor; means for connecting each of said code elements simultaneously to all of said storage stages; means connecting the output of the distributor to selectively open each of said storage stages in a sequence to place one code element in each storage stage; a second storage register having code element stages corresponding to stages of said first storage register; means connected to the output of said second storage register to process said coded word signals at a varying rate dependent upon the sequence of coded word signals received; and means connecting the output signals of said first storage register to input terminals of said second storage register.

11. In combination with a coded word signal message receiving apparatus, an electronic selector and controller system comprising: an electronic signal storage register system having first and second signal storage registers with means supplying input coded word signals to said first signal storage register; means connected to the output of said second storage register to process said coded word signals at a varying rate; a first-in, first-out storage means connected between output terminals on said first signal storage register and input terminals on said second signal storage register, having at least two coded word storage channel registers into which any coded signal that is received can be stored, said first-in, first-out storage means including means enabling storing of a plurality of incoming coded signals up to the number of its own coded word storage channel registers as determined by the rate the coded signals are received and supply of said coded signals from said storage means to said second signal storage register at a rate processed by said apparatus.

12. An electronic selector and controller system as defined in claim 11, further comprising means responsive to the processing of one coded signal by said apparatus for retrieving the coded signal from the next storage channel register of said storage means.

13. In combination with a coded signal message receiving apparatus, an electronic selector and controller system as claimed in claim 11, wherein the receiving apparatus is adapted to receive a sequential form of signals and the means supplying input coded word signals to said first storage register comprises: a transformer having a primary and a secondary winding, connected between line input terminals and the receiver circuit, a transistor oscillator circuit of the type adapted to be powered solely by the incoming signal, connected between said line input terminals and the primary winding of said transformer, circuit means including an R-F filter between said line input terminals and said oscillator circuit for shielding the output signal of said oscillator from the line input terminals, and rectifier means connected between the secondary winding of said transformer and the input to said receiver circuit.

14. In combination with a coded signal message receiving apparatus, an electronic selector and controller system as claimed in claim 12, wherein the means responsive to processing of one coded word signal for retrieving the next coded word signal from said storage means comprises a search register stage for effecting the processing of the signal from the second signal storage register and means for supplying a control signal from said search register to said storage means for effecting the retrieval by said second signal storage register of the next coded word signal from said storage means.

15. In combination with a coded signal message receiving apparatus, an electronic selector and controller system as claimed in claim 12, wherein said storage means comprises a plurality of separate signal storage channels each capable of receiving and storing a plural code element signal, gate means for each storage channel, an input distributor connected to open one of said gates to receive one incoming plural code element signal and to advance to the next storage channel upon completion of the storage of said one signal to receive incoming signals at a random rate, and an output distributor driven independently of said input distributor for searching said storage channels in the same sequence that the input distributor stores the incoming signals.

16. In combination with a coded signal message receiving apparatus, an electronic selector and controller system as claimed in claim 15, wherein said storage means further comprises means for stopping operation of said output distributor during each interval of time a new signal is being added to said storage means.

17. In combination with a coded signal message receiving apparatus, an electronic selector and controller system as claimed in claim 15, wherein a signal storage channel comprises a storage capacitor, an "and" gate for controlling the charging of said capacitor with a negative voltage, a diode having its cathode connected to the negatively charged side of said capacitor and its anode connected to a control terminal, a blocking capacitor and resistor connected in parallel with said storage capacitor and to said cathode, an output terminal connected between said blocking capacitor, and resistor, and said means for retrieving a stored coded signal includes means for applying a positive pulse on said control terminal to discharge said storage capacitor.

18. In combination with a coded signal message receiving apparatus, an electronic selector and controller system as claimed in claim 11, wherein the means supplying input coded word signals to said signal storage register system includes means having an electronic distributor enabling sequential-to-simultaneous signal conversion, said first signal storage register includes a plurality of electronic signal storage stages equal to the number of code elements in the sequential signal, a time base generator is provided and operated at a frequency corresponding to the reciprocal of the time intervals between adjacent code elements in said sequential signal, means connect said time base generator to drive said distributor, means are provided for connecting each of said code elements simultaneously to all of said signal storage stages, and means connecting between the output of the distributor and said storage stages are adapted to selectively open each of said storage stages in a sequence to place successive ones of said code elements in each storage stage.

19. In combination with a coded signal message receiving apparatus, an electronic selector and controller system as claimed in claim 18, said means for connecting each of said code elements to all of said storage stages comprises a normally closed "and" gate having its output connected to the inputs of all of said storage stages and receiving each of said code elements, and a narrow pulse generator driven by said time base generator to provide a narrow output pulse to open said "and" gate for only a short time period when each code element is present.

References Cited

UNITED STATES PATENTS 3,230,510 1/1966 Van Dalen -------- 178—17.5

THOMAS A. ROBINSON, *Primary Examiner.*

UNITED STATES PATENT OFFICE
CERTIFICATE OF CORRECTION

Patent No. 3,359,368 December 19, 1967

Edward F. Kleinschmidt et al.

It is hereby certified that error appears in the above numbered patent requiring correction and that the said Letters Patent should read as corrected below.

Column 6, line 12, for "least" read -- last --; line 54, for "deisgnated" read -- designated --; column 10, line 72, for "1008" read -- 108 --; column 13, line 19, after "125" insert -- are --; column 19, line 21, for "to" read -- so --; column 24, line 42, after "and" insert -- each channel --; line 43, strike out "each channel"; column 28, line 20, after "3" strike out "5" and insert a comma; column 29, line 72, strike out "a narrow output pulse to open said "and" gate for only" and insert the same after "provide" in line 70, same column 29; column 30, line 59, for "supply" read -- supplying --.

Signed and sealed this 11th day of February 1969.

(SEAL)
Attest:

Edward M. Fletcher, Jr.
Attesting Officer

EDWARD J. BRENNER
Commissioner of Patents